US009868279B2

(12) United States Patent
Nakamura

(10) Patent No.: US 9,868,279 B2
(45) Date of Patent: Jan. 16, 2018

(54) PRINT CONTROL APPARATUS, PRINTING APPARATUS, AND DATA PROCESSING METHOD

(71) Applicant: CANON KABUSHIKI KAISHA, Tokyo (JP)

(72) Inventor: Hironori Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/260,992

(22) Filed: Sep. 9, 2016

(65) Prior Publication Data
US 2017/0087823 A1 Mar. 30, 2017

(30) Foreign Application Priority Data

Sep. 29, 2015 (JP) ................................. 2015-192224

(51) Int. Cl.
B41J 29/38 (2006.01)
B41J 2/045 (2006.01)
B41J 2/21 (2006.01)
H04N 1/50 (2006.01)
H04N 1/60 (2006.01)

(52) U.S. Cl.
CPC ....... B41J 2/04536 (2013.01); B41J 2/04586 (2013.01); B41J 2/21 (2013.01); H04N 1/50 (2013.01); H04N 1/60 (2013.01)

(58) Field of Classification Search
CPC ........ B41J 2/3555; B41J 2/36; B41J 2/04536; B41J 2/04586; B41J 2/21
USPC ........................................... 347/5, 12, 14, 19
See application file for complete search history.

(56) References Cited

U.S. PATENT DOCUMENTS 8,462,387 B2 6/2013 Fujita et al.
8,477,397 B2 7/2013 Nakamura et al.

FOREIGN PATENT DOCUMENTS

JP 08-295034 A 11/1996
JP 2012-248996 A 12/2012

Primary Examiner — Jannelle M Lebron
(74) Attorney, Agent, or Firm — Fitzpatrick, Cella, Harper & Scinto

(57) ABSTRACT

According to an embodiment of this invention, a print control apparatus which controls a printhead, including a plurality of nozzle arrays each formed from a plurality of nozzles for discharging ink, for executing printing on a print medium by discharging inks of a plurality of colors from the plurality of nozzle arrays executes the following data processing. That is, image data is received from an external apparatus. One of a plurality of ASICs executes at least common data processing for generating print data corresponding to the plurality of colors with respect to the received image data, and another ASIC executes specific data processing related to each of the plurality of colors. Thus, print data to be output to the printhead is generated, and then transmitted to the printhead.

20 Claims, 15 Drawing Sheets

FIG. 6A

| | INK COLOR SETTING | | | | | | | | | | | |
|---|---|---|---|---|---|---|---|---|---|---|---|---|
| | | INK GROUP A | | | | INK GROUP B | | | | INK GROUP C | | |
| COMMON PARAMETER INFORMATION | INK GROUP COUNT | C | PC | B | G | BK | MBK | GY | PGY | M | PM | R | Y |
| PRINT JOB INFORMATION | 3 | O | O | O | O | O | O | O | O | O | O | O | O |

| | | INK GROUP DESIGNATION K | | | HB CONTROL SIGNAL GROUP DESIGNATION L | | | PRINT CONTROL DESIGNATION | | | | | | | | | | | |
|---|---|---|---|---|---|---|---|---|---|---|---|---|---|---|---|---|---|---|---|
| | | | | | | | | HB CONTROL SIGNAL GROUP A | | | | HB CONTROL SIGNAL GROUP B | | | | HB CONTROL SIGNAL GROUP C | | | |
| PARAMETER INFORMATION | INK GROUP COUNT | A | B | C | A | B | C | DATA0 | DATA1 | DATA2 | DATA3 | DATA4 | DATA5 | DATA6 | DATA7 | DATA8 | DATA9 | DATA10 | DATA11 |
| ASIC110 | 1 | × | O | × | O | × | × | O | O | O | O | × | × | × | × | × | × | × | × |
| ASIC120 | 2 | O | × | O | O | O | × | O | O | O | O | O | O | O | × | × | × | × | × |

(702)

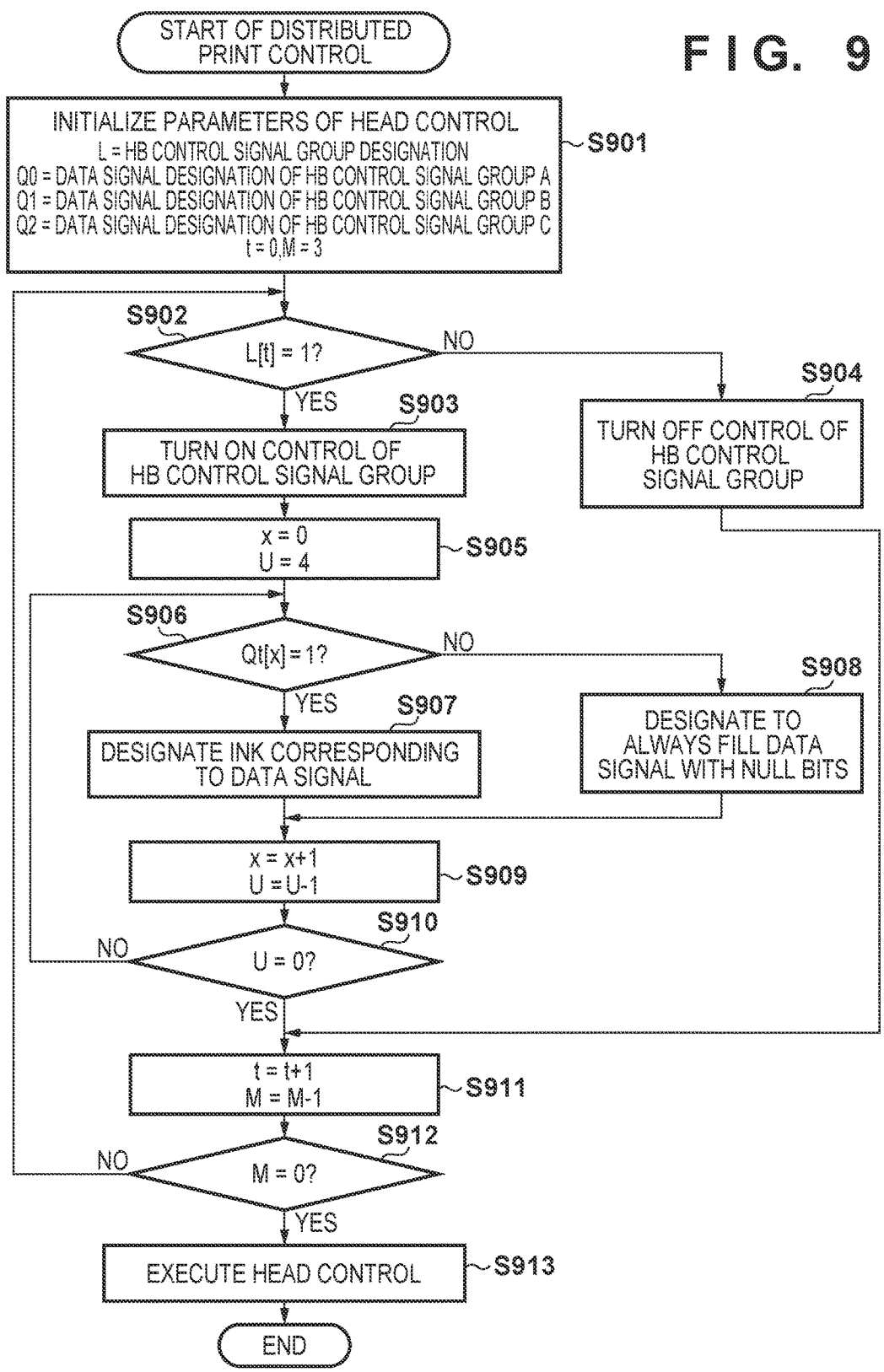

FIG. 10A

| COMMON PARAMETER INFORMATION | INK GROUP COUNT | INK COLOR SETTING ||||||||||
|---|---|---|---|---|---|---|---|---|---|---|---|
| | | INK GROUP A |||| INK GROUP B |||| INK GROUP C |||
| | | C | M | Y | PM | BK | MBK | GY | PC | Y | M | C |
| PRINT JOB INFORMATION | 3 | O | O | O | O | O | X | O | O | O | O | O |

PRINT CONTROL DESIGNATION (FORWARD)

| PARAMETER INFORMATION | INK GROUP COUNT | INK GROUP DESIGNATION ||| HB CONTROL SIGNAL GROUP DESIGNATION (FORWARD) ||| HB CONTROL SIGNAL GROUP A |||| HB CONTROL SIGNAL GROUP B |||| HB CONTROL SIGNAL GROUP C ||||
|---|---|---|---|---|---|---|---|---|---|---|---|---|---|---|---|---|---|---|---|
| | | A | B | C | A | B | C | DATA0 | DATA1 | DATA2 | DATA3 | DATA4 | DATA5 | DATA6 | DATA7 | DATA8 | DATA9 | DATA10 | DATA11 |
| ASIC110 | 1 | O | X | X | O | O | X | O | X | X | O | X | O | X | O | X | X | X | X |
| ASIC120 | 2 | X | O | O | X | X | O | X | O | O | O | O | O | X | O | O | O | X | X |

PRINT CONTROL DESIGNATION (BACKWARD)

| PARAMETER INFORMATION | INK GROUP COUNT | INK GROUP DESIGNATION ||| HB CONTROL SIGNAL GROUP DESIGNATION (BACKWARD) ||| HB CONTROL SIGNAL GROUP A |||| HB CONTROL SIGNAL GROUP B |||| HB CONTROL SIGNAL GROUP C ||||
|---|---|---|---|---|---|---|---|---|---|---|---|---|---|---|---|---|---|---|---|
| | | A | B | C | A | B | C | DATA0 | DATA1 | DATA2 | DATA3 | DATA4 | DATA5 | DATA6 | DATA7 | DATA8 | DATA9 | DATA10 | DATA11 |
| ASIC110 | 1 | O | X | X | O | O | X | O | X | X | O | X | O | X | O | X | X | X | X |
| ASIC120 | 2 | X | O | O | X | X | O | X | O | O | O | O | O | X | O | O | O | X | X |

1002

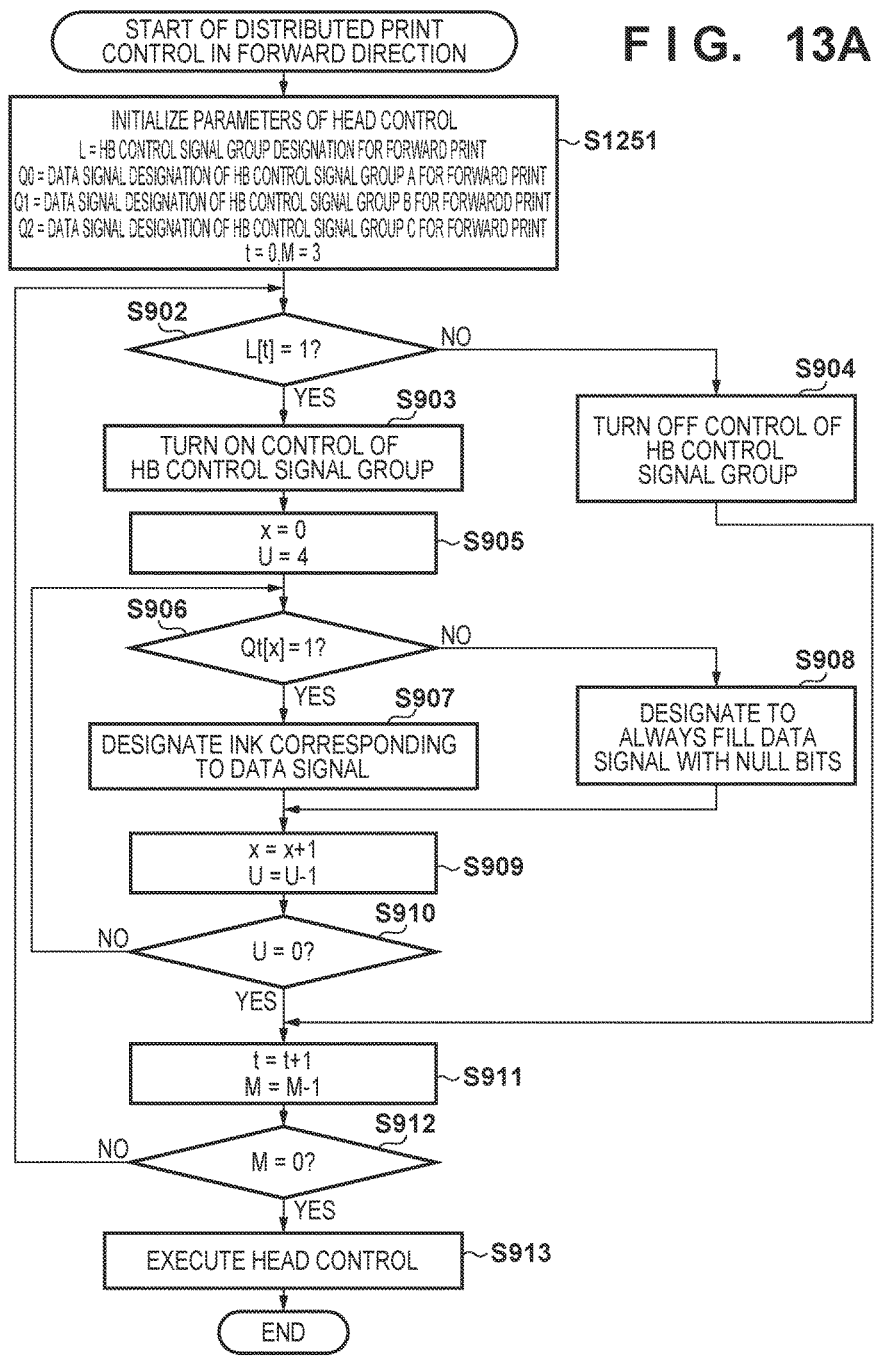

F I G. 15A

| COMMON PARAMETER INFORMATION | INK GROUP COUNT | INK COLOR SETTING |||||||||||
|---|---|---|---|---|---|---|---|---|---|---|---|
| | | INK GROUP A ||| INK GROUP B |||| INK GROUP C |||
| | | C | PC | B | G | BK | MBK | GY | PGY | M | PM | R | Y |
| PRINT JOB INFORMATION | 3 | ○ | ○ | ○ | ○ | ○ | ○ | ○ | ○ | ○ | ○ | ○ | ○ |

701

F I G. 15B

| PARAMETER INFORMATION | INK GROUP COUNT | INK GROUP DESIGNATION |||||| HB CONTROL SIGNAL GROUP DESIGNATION ||| PRINT CONTROL DESIGNATION ||||||||||||
|---|---|---|---|---|---|---|---|---|---|---|---|---|---|---|---|---|---|---|---|---|---|
| | | A | B | C | A | B | C | A | B | C | HB CONTROL SIGNAL GROUP A |||| HB CONTROL SIGNAL GROUP B |||| HB CONTROL SIGNAL GROUP C |||
| | | | K ||| | L || | | | DATA0 | DATA1 | DATA2 | DATA3 | DATA4 | DATA5 | DATA6 | DATA7 | DATA8 | DATA9 | DATA10 | DATA11 |
| ASIC110 | 1 | ○ | × | × | × | × | × | ○ | ○ | × | ○ | ○ | ○ | ○ | ○ | ○ | ○ | ○ | × | × | × | × |
| ASIC120 | 1 | × | ○ | × | × | × | × | ○ | ○ | × | ○ | ○ | ○ | ○ | ○ | ○ | ○ | ○ | × | × | × | × |
| ASIC1300 | 1 | × | × | ○ | × | × | ○ | ○ | ○ | ○ | ○ | ○ | ○ | ○ | ○ | ○ | ○ | ○ | × | × | × | × |

1402

PRINT CONTROL APPARATUS, PRINTING APPARATUS, AND DATA PROCESSING METHOD

BACKGROUND OF THE INVENTION

Field of the Invention

The present invention relates to a print control apparatus, a printing apparatus, and a data processing method, and particularly to, for example, a print control apparatus that controls printing of an inkjet printhead for executing printing by reciprocally scanning while discharging ink onto a print medium, a printing apparatus, and a data processing method.

Description of the Related Art

A conventional inkjet printing apparatus (for example, a printer or the like) receives multi-valued image data from a host PC, performs processing of converting the image data into print data printable by the printer, and then prints an image on a print medium (for example, a paper sheet, a photographic paper sheet, a postcard, or the like). The printable print data is data indicating an amount of ink to be discharged onto a print medium, and is, for example, data used for printing using four color inks of C (cyan), M (magenta), Y (yellow), and K (black). Furthermore, depending on the apparatus, the print data may be data used for printing using 12 color inks including PC, PM, R, G, B, MB, Gray, and PG in addition to the above colors.

Some of printers for high-end users use 12 color inks for high-image-quality printing, and include an image data processing unit capable of generating print data of 12 colors. Since it is impossible to execute printing before data processing of the 12 colors finishes, it is necessary to increase the data processing speed to increase the print speed. As a method of increasing the speed of the image data processing unit, an ASIC that can implement a custom specification by hardware can be used although a long development period is required.

On the other hand, specifications for respective products have diversified, and products for executing printing using various numbers of inks have appeared on the market. Thus, if an ASIC is developed for the specifications of each product, it becomes difficult to commercially introduce each product timely, and enormous development resources are required.

To solve the above problems, Japanese Patent Laid-Open No. 2012-248996 has proposed a technique of building a system that can flexibly comply with the specifications of each product by arranging a plurality of identical ASICs. More specifically, if image data as a target to be processed cannot be processed by one ASIC, processing of transferring some of the image data to another ASIC to be processed, receiving the image data having undergone data processing, composing the received image data, and then transferring the thus obtained data to an engine driving unit is performed.

In an apparatus for executing printing by mounting a printhead on a carriage and reciprocally scanning the carriage, to increase the print speed, a required speed for one scan is determined in a configuration in which a plurality of identical ASICs are used to execute data processing, as described above. The scale and development period of each ASIC are determined by implementing image data processing by ASICs to achieve a speed for one scan for each of a product that processes a small image data amount and a product that processes a large image data amount.

A recent inkjet printing apparatus has coped with its increased size and increased number of color inks. Thus, the data processing unit for generating print data is also expected to perform data processing at a higher speed regardless of the number of ink colors.

Japanese Patent Laid-Open No. 2012-248996, however, has proposed a configuration in which if a processing size (for example, a paper size) is large, input image data is distributed and identical ASICs execute distributed processing for respective print areas. Therefore, this configuration may not be optimum in a case where distributed processing that can flexibly cope with the number of ink colors is performed. In the configuration proposed in Japanese Patent Laid-Open No. 2012-248996, distributed processing results are put together in one ASIC. Consequently, since data transfer is often performed between the ASICs at a high speed, it is necessary to include high-speed interfaces, thereby increasing the scales of the ASICs. This is not an optimized configuration in terms of suppression of the development cost of ASICs.

On the other hand, a configuration of performing the distributed processing of image data for respective ink color components by a plurality of ASICs is desirable in terms of load distribution of data processing. A configuration capable of controlling the processed data in the same ASIC with the engine side is desirable to suppress exchange of data between the ASICs as much as possible.

SUMMARY OF THE INVENTION

Accordingly, the present invention is conceived as a response to the above-described disadvantages of the conventional art.

For example, a print control apparatus, a printing apparatus, and a data processing method according to this invention are capable of implementing optimized distributed processing using a plurality of integrated circuits which can perform parallel processing.

According to one aspect of the present invention, there is provided a print control apparatus which includes a plurality of nozzle arrays each formed from a plurality of nozzles for discharging ink, and controls a printhead for executing printing on a print medium by discharging inks of a plurality of colors from the plurality of nozzle arrays, the apparatus comprising: a reception unit configured to receive image data from an external apparatus; a generation unit configured to generate print data to be output to the printhead by causing one of a plurality of integrated circuits to execute at least common data processing for generating print data corresponding to the plurality of colors with respect to the image data received by the reception unit, and causing another one of the plurality of integrated circuits to execute specific data processing related to each of the plurality of colors; and a transmission unit configured to transmit the print data generated by the generation unit to the printhead.

According to another aspect of the present invention, there is provided a printing apparatus comprising: a print control apparatus having the above arrangement; a scan unit configured to reciprocally scan by incorporating the printhead; and a conveyance unit configured to convey the print medium in a direction different from a scanning direction by the scan unit, wherein the plurality of nozzle arrays of the printhead are arrayed in the scanning direction by the scan unit.

According to still another aspect of the present invention, there is provided a data processing method for a print control apparatus which controls a printhead, including a plurality of nozzle arrays each formed from a plurality of nozzles for discharging ink, for executing printing on a print medium by discharging inks of a plurality of colors from the plurality of nozzle arrays, the method comprising: receiving image data from an external apparatus; generating print data to be output to the printhead by causing one of a plurality of integrated circuits to execute at least common data processing for generating print data corresponding to the plurality of colors with respect to the received image data, and causing another one of the plurality of integrated circuits to execute specific data processing related to each of the plurality of colors; and transmitting the generated print data to the printhead.

The invention is particularly advantageous since it is not necessary to distribute data processing by a plurality of integrated circuits and put processed print data together in one integrated circuit, and it is thus possible to suppress exchange of the print data between the integrated circuits as much as possible.

Further features of the present invention will become apparent from the following description of exemplary embodiments (with reference to the attached drawings).

BRIEF DESCRIPTION OF THE DRAWINGS

FIGS. 6A and 6B are tables each showing parameter information generated by the CPU of an ASIC 100 based on a print job.

FIG. 9 is a flowchart illustrating distributed processing in head control of each of the ASICs 110 and 120.

FIGS. 10A and 10B are tables each showing parameter information generated by the CPU of an ASIC based on a print job according to the second embodiment.

FIGS. 13A and 13B are flowcharts respectively illustrating distributed print control processes for a symmetric printhead, which are executed by each of the ASICs.

FIGS. 15A and 15B are tables each showing parameter information according to the third embodiment.

DESCRIPTION OF THE EMBODIMENTS

Exemplary embodiments of the present invention will now be described in detail in accordance with the accompanying drawings.

In this specification, the terms "print" and "printing" not only include the formation of significant information such as characters and graphics, but also broadly include the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "print element" generically means an ink orifice or a liquid channel communicating with it, and an element for generating energy used to discharge ink, unless otherwise specified.

Furthermore, an "ASIC" generally indicates an application-specific integrated circuit. However, the "ASIC" need not be limited to the meaning of "application-specific", and indicates an "integrated circuit" in which circuits having a plurality of functions are integrated in this specification.

<General Outline of Printing Apparatus (FIGS. 1 to 3)>

Figure 1:
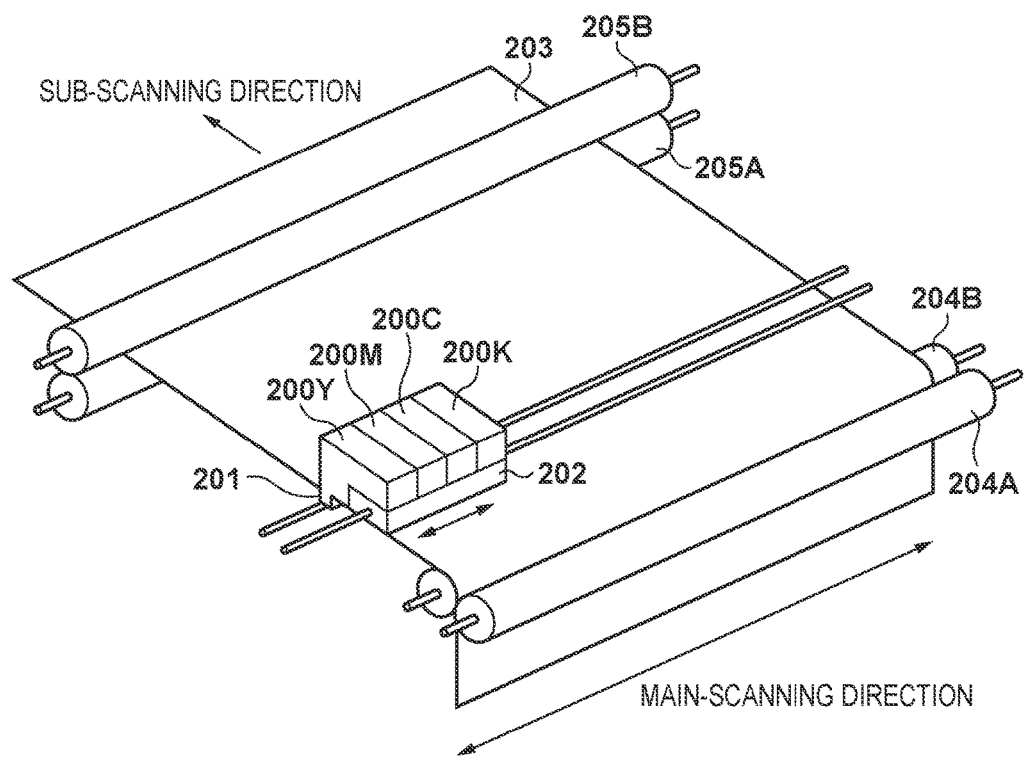
FIG. 1 is a perspective view showing an outline of the configuration of an inkjet printing apparatus according to an exemplary embodiment of the present invention.

FIG. 1 is a perspective view showing the schematic configuration of an inkjet printing apparatus (to be referred to as a printing apparatus hereinafter) according to an exemplary embodiment of the present invention.

In this printing apparatus, four ink tanks 200Y, 200M, 200C, and 200K that respectively contain color inks of Y, M, C, and K and a printhead 201 that discharges, as ink droplets, the inks supplied from these ink tanks are mounted on a carriage 202. While reciprocally moving the carriage 202 in the main-scanning direction at a constant speed, ink droplets are discharged from the printhead 201 at a frequency corresponding to the speed, thereby printing an image on a print medium. Every time one printing operation in the main-scanning direction ends, a print medium 203 is conveyed in the sub-scanning direction (conveyance direction) perpendicular to the main-scanning direction by a predetermined amount. The print medium 203 is conveyed in the sub-scanning direction by driving two pairs of conveyance rollers 204A and 204B and 205A and 205B by a conveyance motor (not shown) while these two pairs of conveyance rollers nip the print medium 203.

By intermittently repeating the printing in the main-scanning direction and the conveyance operation, an image is printed stepwise on the print medium 203. This operation is controlled by a controller 301 (to be described later).

Figure 2:
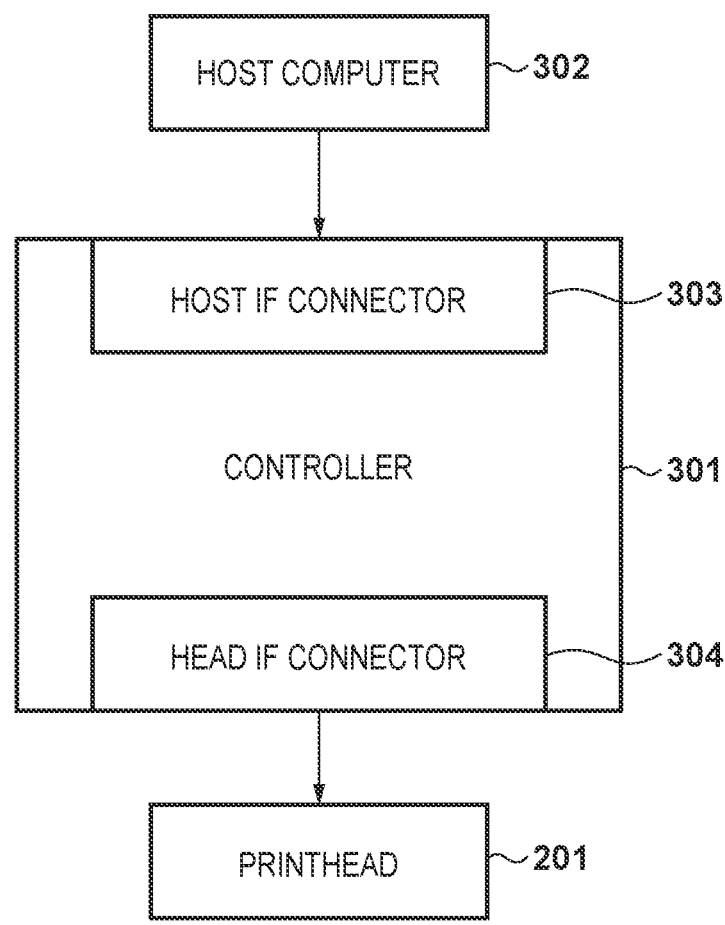
FIG. 2 is a block diagram showing the schematic control configuration of the printing apparatus shown in FIG. 1.

FIG. 2 is a block diagram showing the schematic control configuration of the printing apparatus shown in FIG. 1.

A host computer (to be referred to as a host hereinafter) 302 that generates a print job including image data and print condition information necessary for printing is connected to, via a host interface connector (to be referred to as a host IF connector hereinafter) 303, the controller 301 that generates print data and controls the overall printing apparatus. A print job necessary for generation of print data is received from the host 302 serving as an external apparatus via the host IF connector 303. Print data necessary for printing is transmitted to the printhead 201 via a head interface connector (to be referred to as a head IF connector hereinafter) 304.

Whatever the internal configuration of the controller 301 is, the controller 301 is externally connected via the host IF connector 303 and the head IF connector 304. Note that since the printhead 201 used in this embodiment uses 12 color inks, the controller 301 generates print data of 12 color components and transmits them to the printhead 201. The 12 colors are cyan (C), photo cyan (PC), blue (B), green (G), photo black (BK), mat black (MBK), gray (GY), photo gray (PGY), magenta (M), photo magenta (PM), red (R), and yellow (Y).

Figure 3:
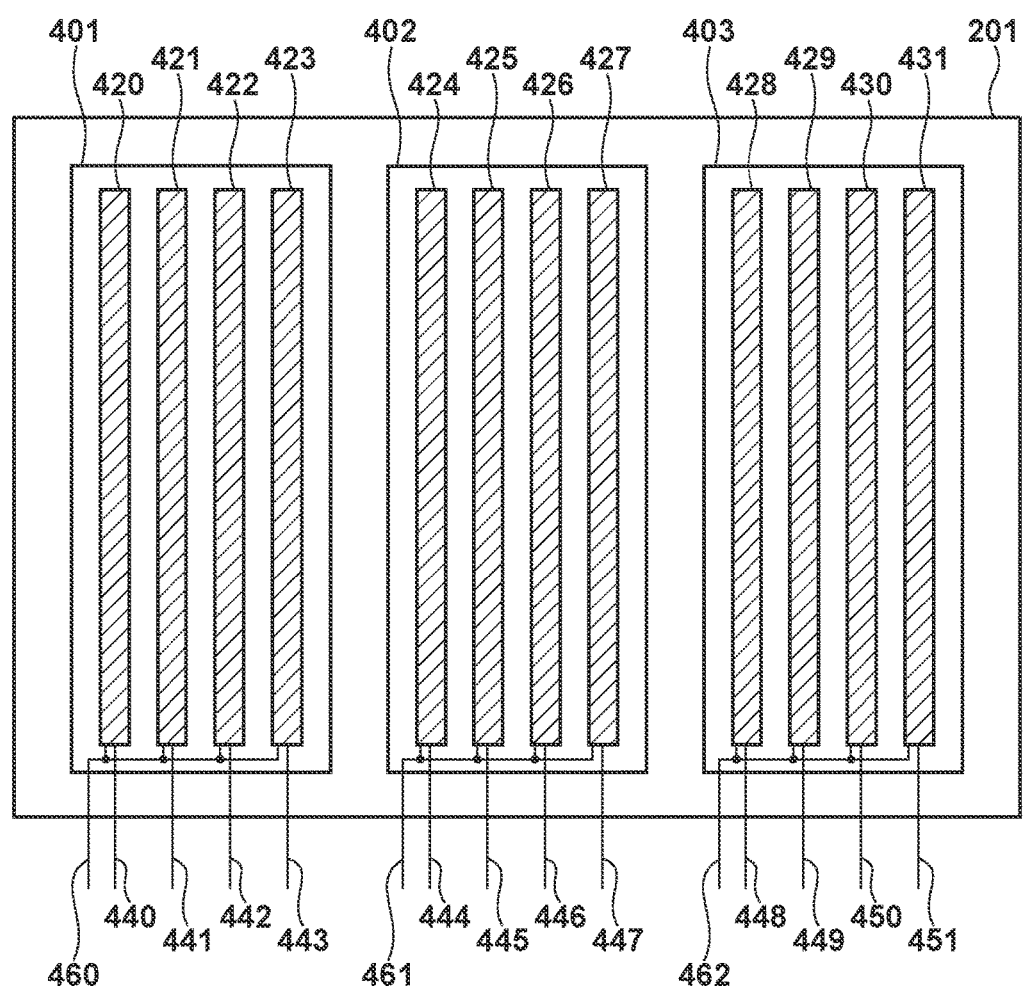
FIG. 3 is a view showing the configuration of the nozzle arrangement of a printhead.

FIG. 3 is a view showing the configuration of the nozzle arrangement of the printhead 201.

As shown in FIG. 3, the printhead 201 is formed from three heater board chips (to be referred to as HB chips hereinafter) 401, 402, and 403. Each HB chip includes four nozzle arrays each formed from a plurality of nozzles (orifices) for discharging ink. That is, the HB chip 401 includes four nozzle arrays 420 to 423. Discharge control information for controlling energy generation elements corresponding to the respective nozzles of the nozzle array 420 is sent from the controller 301 by a data signal 440. For example, information of ON/OFF of discharge of ink is transferred, and then whether to discharge ink droplets onto a print medium is determined based on the information. Similarly, each of data signals 441, 442, and 443 is transferred from the controller 301 to a corresponding one of the nozzle arrays 421, 422, and 423 as discharge control information for the respective nozzles of the corresponding nozzle array.

A clock signal CLK 460 is a common synchronization clock signal for transmitting the data signals Data 440 to 443 to the printhead 201 at a correct timing. If there is a clock signal CLK for each data signal, the independency between the data signals is improved. However, the number of signal lines to the printhead increases, thereby increasing the cost of the HB chip. Especially for a printhead that executes high-speed printing, the data transfer rate is high, and thus a high speed data signaling method such as LVDS is often adopted, thereby increasing the number of signal lines due to twist pair signals. To avoid such factor of increasing the cost, in this embodiment, one clock signal CLK is provided for the four data signals, thereby suppressing an increase in the cost of the HB chip.

The HB chip 402 has the same configuration as that of the HB chip 401, and includes nozzle arrays 424 to 427 and receives data signals Data 444 to 447 and a clock signal CLK 461. The HB chip 403 also has the same configuration as that of the HB chip 401, and includes nozzle arrays 428 to 431 and receives data signals Data 448 to 451 and a clock signal CLK 462.

As described above, the HB chips 401, 402, and 403 having the same configuration are mounted on the printhead 201.

Figure 4:
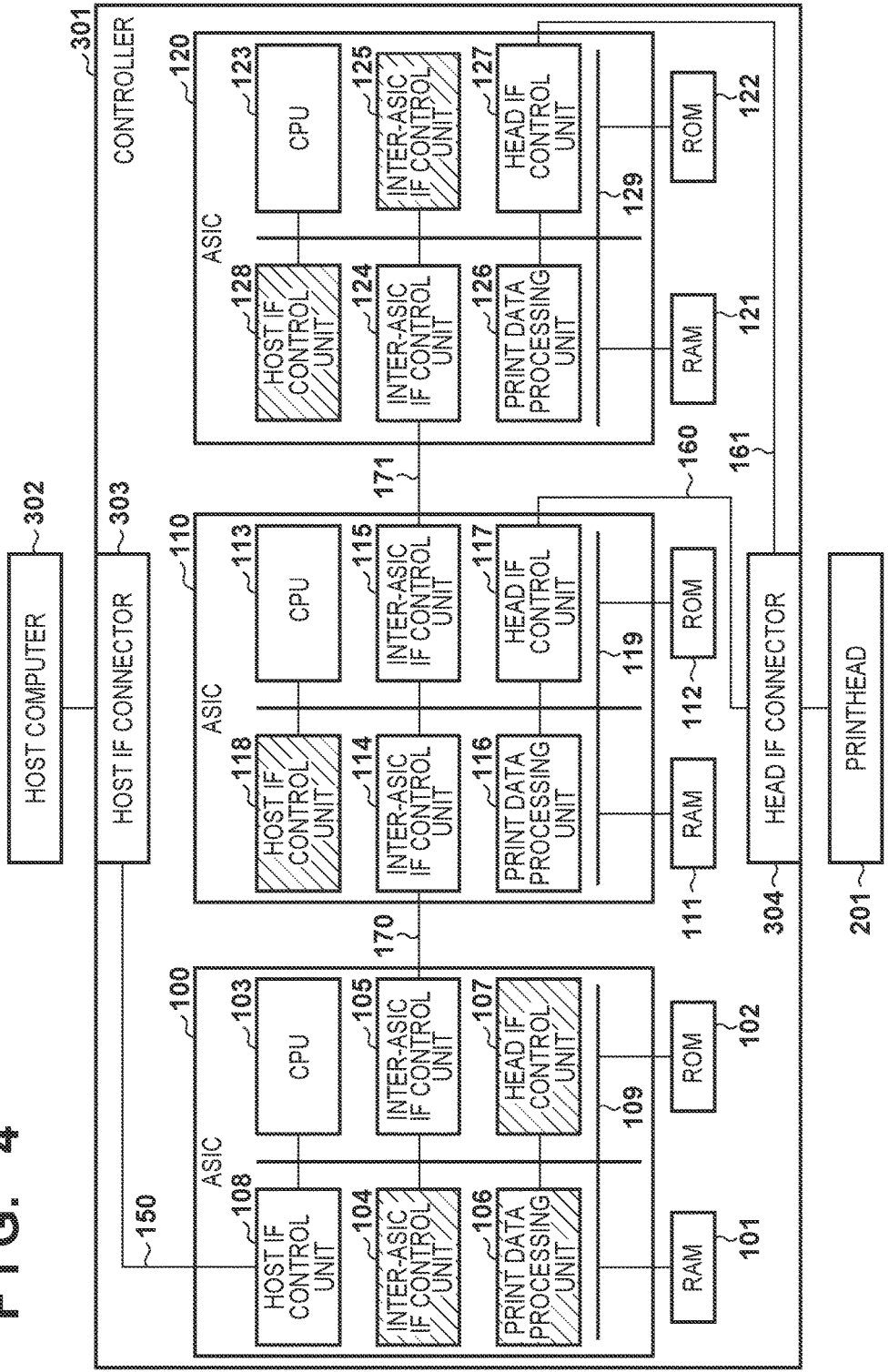
FIG. 4 is a block diagram showing the detailed internal configuration of a controller.

FIG. 4 is a block diagram showing the detailed internal configuration of the controller 301. The controller 301 includes the above-described host IF connector 303 and head IF connector 304, and a plurality of ASICs 100, 110, and 120 having the same configuration, RAMS 101, 111, and 121, and ROMs 102, 112, and 122, as shown in FIG. 4.

Note that these three ASICs have the same configuration but have different roles. The ASIC 100 executes communication with the host 302 and control of transmission data to the ASICs 110 and 120 as a main role. Each of the ASICs 110 and 120 executes processing of print data related to ink colors and control of the printhead as a main role. The ROMs 102, 112, and 122 store programs for controlling the printing apparatus by the ASICs 100, 110, and 120, respectively. Each of the RAMS 101, 111, and 121 is used as the execution area of the program and the storage area of various data by each ASIC. The ASICs 100, 110, and 120 include dedicated CPUs 103, 113, and 123, respectively. These CPUs execute the programs stored in the ROMs 102, 112, and 122, thereby controlling the printing apparatus via the ASICs 100, 110, and 120.

A host IF control unit 108 is connected to the host 302 via the host IF connector 303 by a signal group 150, communicates with the host 302, receives a print job, and stores it in the RAM 101. At this time, image data included in the print job is image data (to be referred to as a multi-valued image data hereinafter) having gradations in which each pixel is formed by three colors of red (R), green (G), and blue (B) and each color has 8 gradation bits. Note that host IF control units 118 and 128 are mounted on the ASICs 110 and 120, respectively, but they are not connected to the host IF connector 303 and are not thus used in this embodiment. Note that in this embodiment, a wired LAN is used as the host interface and protocol processing on the network is executed by the host IF control unit 108 or the CPU 103.

An inter-ASIC interface control unit (to be referred to as an inter-ASIC IF control unit hereinafter) 105 is connected to the ASIC 110 via a signal group 170, and controls to transmit, to the ASIC 110, multi-valued image data and processing parameters included in a print job stored in the RAM 101. The processing parameters are parameters which are prepared in advance by the CPU 103 in accordance with the print conditions of the print job and are referred to by the print data processing unit and head IF control unit.

As shown in FIG. 4, two interface control units for interconnecting the ASICs are mounted on each of the ASICs 100, 110, and 120. In this embodiment, since the three ASICs are used in the configuration, the six interface control units in total are prepared. The inter-ASIC IF control unit 105 and an inter-ASIC IF control unit 114 are used to connect the ASICs 100 and 110, and inter-ASIC IF control units 115 and 124 are used to connect the ASICs 110 and 120. Note that inter-ASIC IF control units 104 and 125 have no connection destination ASICs, and are not thus used in this embodiment.

The inter-ASIC IF control unit 114 is connected to the ASIC 100 via the signal group 170, and stores, in the RAM 111, the multi-valued image data and processing parameters received from the ASIC 100. The inter-ASIC IF control unit 115 is connected to the ASIC 120 via a signal group 171, and transmits, to the ASIC 120, the multi-valued image data and processing parameters stored in the RAM 111. The inter-ASIC IF control unit 124 is connected to the ASIC 110 via the signal group 171, and stores, in the RAM 121, the multi-valued image data and processing parameters received from the ASIC 110.

At this time, the same multi-valued image data is transmitted/received. The processing parameters include common parameters and individual parameters. The common parameters are loaded to the ASICs 110 and 120, and the individual parameters are loaded in accordance with contents to be processed by the ASICs 110 and 120. For example, the processing parameters of a color conversion table from an sRGB space into a dRGB space are common parameters, and the processing parameters of a color conversion table from the dRGB space into the color space of the ink colors and the processing parameters of processing for lowering a number of gradations for each ink color are individual parameters.

This embodiment adopts PCI-Express (PCIe) as an inter-ASIC IF, and the inter-ASIC IF control unit performs DMA control and the protocol processing of PCIe.

In accordance with the processing parameters stored in the RAM 111, a print data processing unit 116 executes, for the multi-valued image data stored in the RAM 111, processing of generating print data printable by the printhead 201. The generated print data is stored in the RAM 111. In accordance with the processing parameters stored in the RAM 121, a print data processing unit 126 executes, for the multi-valued image data stored in the RAM 121, processing of generating print data printable by the printhead 201, similarly to the print data processing unit 116. The generated print data is stored in the RAM 121. Note that in this embodiment, a print data processing unit 106 is configured not to execute processing related to the ink colors in the ASIC 100, and is not thus used.

At this time, the print data processing unit executes ink color-independent data processing in accordance with the common parameters. More specifically, the print data processing unit performs color conversion from the sRGB space into the dRGB space to generate multi-valued image data in the dRGB space. Subsequently, in accordance with the individual parameters, contents related to ink colors for which the corresponding ASIC is responsible are instructed, and color space conversion into the color space of the ink colors is executed for the multi-valued image data in the dRGB space, thereby performing processing for lowering the number of gradations to generate printable print data. In this embodiment, assume that the printable print data is binary image data.

In accordance with the processing parameters stored in the RAM 111, a head IF control unit 117 transmits, to the head IF connector 304 via a signal group 160, the binary image data as the print data stored in the RAM 111. Similarly to the head IF control unit 117, in accordance with the processing parameters stored in the RAM 121, a head IF control unit 127 transmits, to the head IF connector 304 via a signal group 161, the binary image data as the print data stored in the RAM 121.

Each of common buses 109, 119, and 129 is a signal group formed by a plurality of signal lines which can internally connect the host IF control unit, the CPU, the two inter-ASIC IF control units, the print data processing unit, and the head IF control unit in the corresponding ASIC, and externally connect the RAM and the ROM. The connected components can communicate with each other via each of the common buses 109, 119 and 129. The connection configuration of the signal groups 160 and 161, the head IF connector 304, and the printhead 201 is determined based on ink colors for which the print data processing units 116 and 126 are responsible.

By arranging assignment of the ink colors, the ASICs can be flexibly connected to the printhead 201, thereby making it possible to reduce the cost of the single ASIC.

Embodiments of the connection configuration of a serial head interface (IF) and the head interface (IF) signals of the controller 301 will be described using the printing apparatus having the above configuration by exemplifying assignment of the ink colors in the printhead.

First Embodiment

Figure 5:
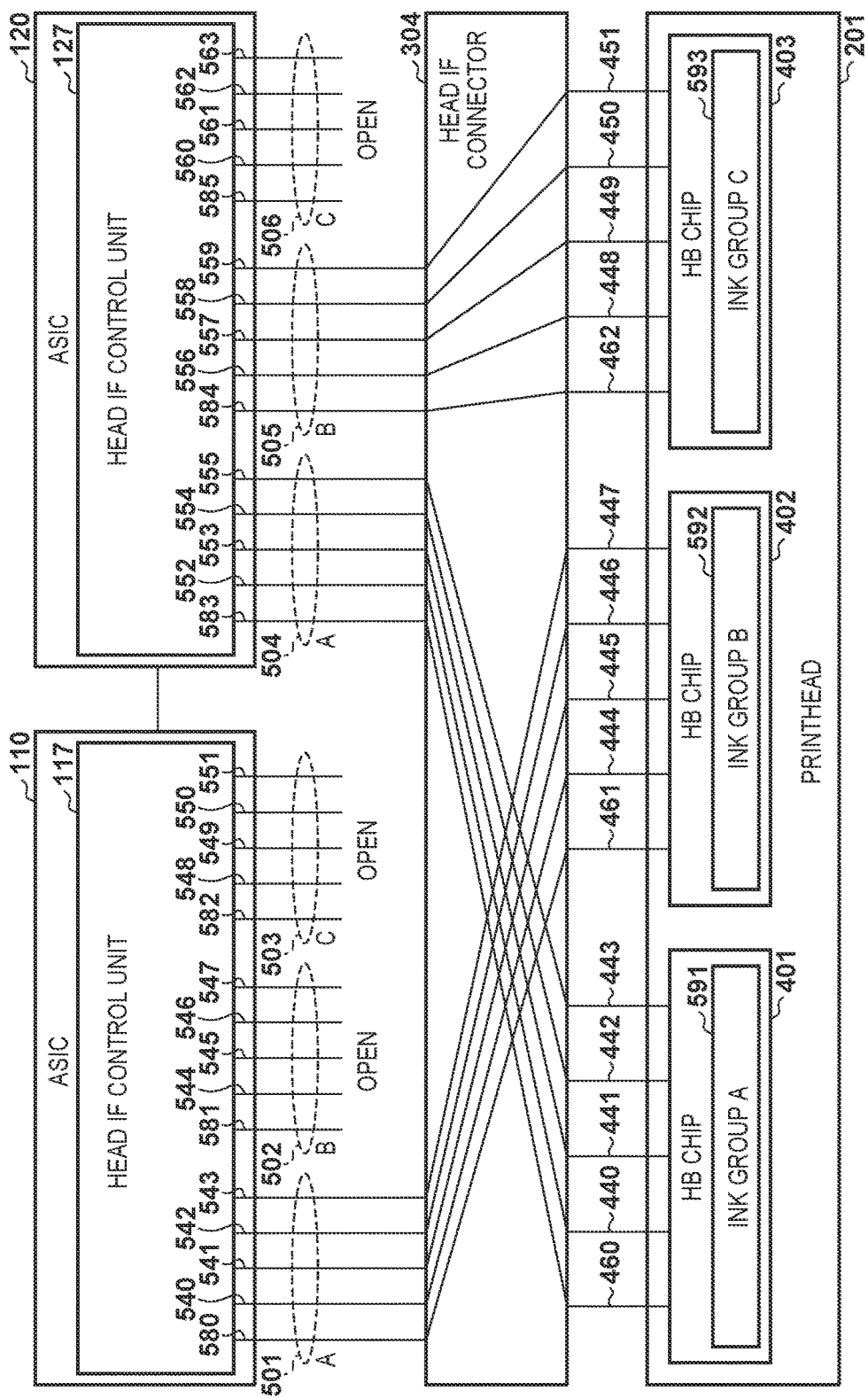
FIG. 5 is a view showing assignment of ink colors in a printhead and the connection configuration of the printhead and the head IF signals of a controller.

FIG. 5 is a view showing the assignment of ink colors in a printhead 201 and the connection configuration of the printhead 201 and the head IF signals of a controller 301.

Signal groups 160 and 161 respectively output from head IF control units 117 and 127 will be described first.

The signal groups 160 and 161 as the output signals of the head IF control units 117 and 127 can be connected to one to three HB chips. As described above, one clock signal CLK and four data signals Data, that is, five signals in total are input to one HB chip. Thus, five signal lines in total formed from the one clock signal CLK and the four data signals Data are provided as signals output from the head IF control unit to match clock phases. Note that the group of five signal lines will be referred to as a heater board control signal group (to be referred to as an HB control signal group hereinafter). As shown in FIG. 5, each head IF control unit includes three HB control signal groups A to C. Consequently, the output signals from each head IF control unit are formed from 15 signal lines.

That is, the signal group 160 of the head IF control unit 117 of an ASIC 110 is formed from HB control signal groups 501, 502, and 503. The HB control signal group 501 is formed by five signals of a clock signal CLK 580 and data signals Data 540 to 543. Similarly, the HB control signal groups 502 to 506 are respectively formed by clock signals CLK 581 to 585 and data signals Data 544 to 563.

Connection is determined for each HB chip. Therefore, for example, if only two HB chips are used, two of the three HB control signal groups A to C are used. More specifically, 10 signal lines are used for two clock signals and eight data signals. An unused HB control signal group remains open, and the head IF control unit performs control not to execute drive control for the unused HB control signal group.

Note that if no ink is discharged from given nozzles in accordance with the print conditions, the head IF control unit can control to transmit information indicating that no ink is discharged for the corresponding data signals Data of the connected HB control signal groups.

Subsequently, assignment of the ink colors in the printhead will be described.

In assignment of the ink colors, an ink group is determined for each HB chip. In this embodiment, three ink groups are provided. That is, an ink group A 591 includes four color inks of C, PC, B, and G. An ink group B 592 includes four color inks of BK, MBK, GY, and PGY. An ink group C 593 includes four color inks of M, PM, R, and Y. An HB chip 401 is assigned with the inks of the ink group A 591. An HB chip 402 is assigned with the inks of the ink group B 592. An HB chip 403 is assigned with the inks of the ink group C 593. The assigned inks are respectively discharged from nozzle arrays 420 to 423, 424 to 427, and 428 to 431. More specifically, the nozzle arrays 420 to 431 are sequentially assigned with the inks of C, PC, B, G, BK, MBK, GY, PGY, M, PM, R, and Y.

Subsequently, the connection configuration of the signal groups 160 and 161 and the printhead 201 will be described.

In this embodiment, since one printhead is controlled, three HB control signal groups are used. As shown in FIG. 5, three of the six HB control signal groups 501 to 506 of the head IF control units 117 and 127 are used. In this embodiment, the HB control signal groups 501, 504, and 505 are used. On the other hand, the HB control signal groups 502, 503, and 506 are unused, and the terminals of the respective signals are open.

The clock signal CLK 580 of the HB control signal group 501 is connected to a signal 461 and the data signals Data 540 to 543 are respectively connected to signals 444 to 447, thereby transmitting print data to the HB chip 402. The clock signal CLK 583 of the HB control signal group 504 is connected to a signal 460, and the data signals Data 552 to 555 are respectively connected to signals 440 to 443, thereby transmitting print data to the HB chip 401. The clock signal CLK 584 of the HB control signal group 505 is connected to a signal 462 and the data signals Data 556 to 559 are connected to signals 448 to 451, thereby transmitting print data to the HB chip 403.

Since the connection of the ASICs and the printhead is determined by the above ink assignment, the ASIC 110 performs generation and transmission control of the print data of the ink group B 592, and an ASIC 120 performs generation and transmission control of the print data of the ink group A 591 and ink group C 593.

FIGS. 6A and 6B are tables each showing parameter information generated by a CPU 103 of an ASIC 100 based on a print job.

Referring to FIG. 6A, parameter information 701 indicates parameters related to the ink groups at the time of printing out of pieces of information included in the print conditions of the print job, and shows an example in which execution of printing using the 12 color inks is designated. In this example, an ink group count and ink color settings are designated for each print job. Colors to be used are designated for each ink group in the ink color settings.

The CPU 103 of the ASIC 100 generates, based on the pieces of information, parameter information 702 shown in FIG. 6B to be transferred to the ASICs 110 and 120. This parameter information includes an ink group count, ink group designation, HB control signal group designation, and print control designation for each ASIC. In the print control designation, an HB control signal group to be used and a data signal Data to be used are designated.

For example, for the ASIC 110, the use of one ink group, ink group B, HB control signal group A, and data signals Data0 to Data3 is designated. Similarly, for the ASIC 120, the use of two ink groups, ink groups A and C, HB control signal groups A and B, and data signals Data0 to Data7 is designated. The ASICs 110 and 120 perform print data processing and head control based on the parameter information. In this way, based on the parameter information 702, distributed processing of the print data and distributed control of the printhead for printing using the 12 color inks are executed.

The data flow of the overall system will be described next.

Figure 7A:
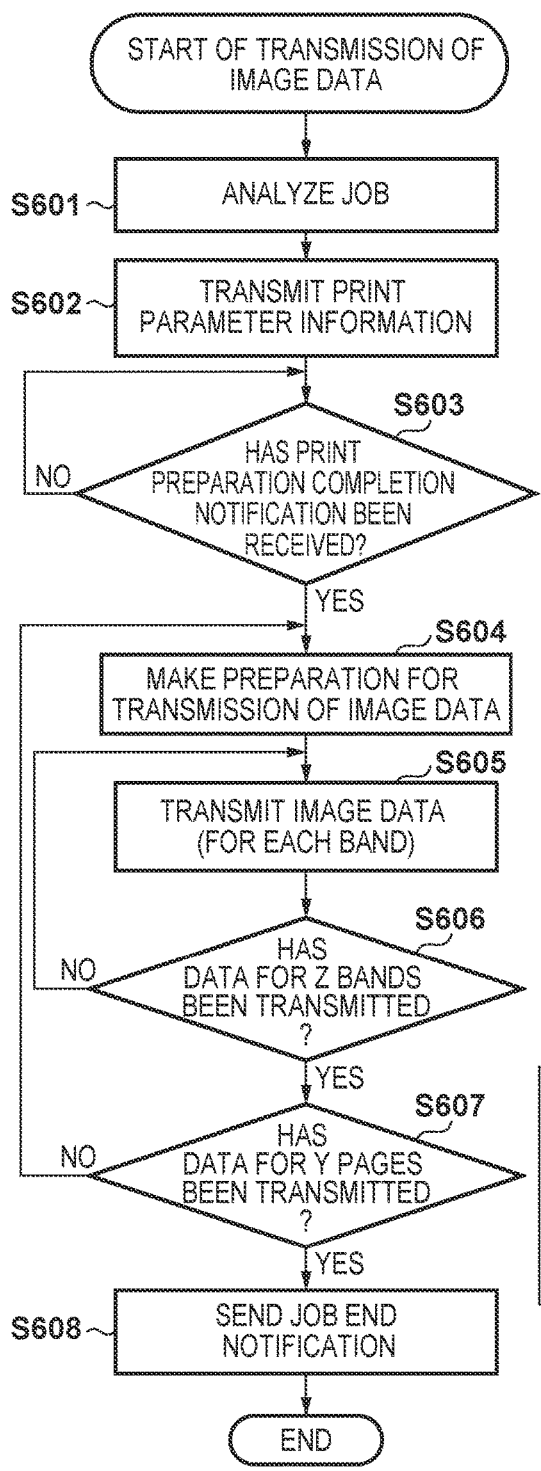
FIG. 7A is a flowchart illustrating transmission processing in which the ASIC 100 transmits image data to ASICs 110 and 120.
Figure 7B:
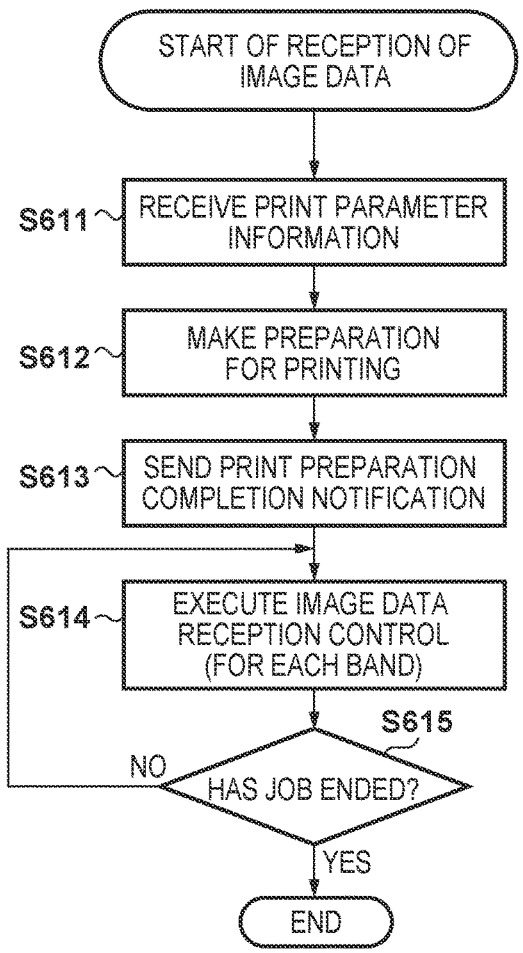
FIG. 7B is a flowchart illustrating reception processing in which each of the ASICs 110 and 120 receives the image data from the ASIC 100.

FIGS. 7A and 7B are flowcharts respectively showing transmission processing in which the ASIC 100 transmits image data to each of the ASICs 110 and 120 and reception processing in which each of the ASICs 110 and 120 receives image data from the ASIC 100. FIG. 7A shows the transmission processing and FIG. 7B shows the reception processing.

The image data transmission processing will first be described with reference to FIG. 7A.

In step S601, the CPU 103 generates print parameter information to be used by the print data processing units 116 and 126 and head IF control units 117 and 127 of the ASICs 110 and 120 in accordance with print conditions included in a print job, and stores the generated information in a RAM 101. The print conditions indicate the parameter information 701, and the print parameter information indicates the parameter information 702. A print page count Y in one print job is acquired from the print job. Next, in step S602, the CPU 103 extracts the print parameter information from the RAM 101, and transmits it to an inter-ASIC IF control unit 114 via an inter-ASIC IF control unit 105.

In step S603, the CPU 103 waits for a notification indicating that print preparation by the ASICs 110 and 120 is complete. Upon receiving the notification, the process advances to step S604. In step S604, the CPU 103 sets, in the DMAC of the inter-ASIC IF control unit 105, a band count Z and a data size for each band to send image data of one page for each band. In step S605, the CPU 103 activates the DMAC of the inter-ASIC IF control unit 105 to perform DMA transmission of the image data to the ASIC 110 for each band. After completion of transfer for one band, the process advances to step S606. In step S606, it is checked whether DMA transmission for Z bands is complete. If DMA transmission for Z bands is not complete, the process returns to step S605; otherwise, the process advances to step S607.

In step S607, it is checked whether DMA transmission for Y pages of the image data is complete. If DMA transmission for Y pages is not complete, the process returns to step S604 to set the band count Z and a data size for each band in accordance with the next image data size. To the contrary, if DMA transmission for Y pages is complete, the process advances to step S608. In step S608, the ASICs 110 and 120 are notified via the inter-ASIC IF control unit 105 that transmission of the image data is complete, thereby terminating the image data transmission processing.

The image data reception processing will be described next with reference to FIG. 7B. The reception processing of the ASIC 110 will be exemplified.

In step S611, the parameter information 702 received by the inter-ASIC IF control unit 114 is stored in a RAM 111. In step S612, the CPU 113 reads out the parameter information 702 stored in the RAM 111, and makes parameter settings of the print data processing unit 116 and head IF control unit 117. Note that ink group-related setting processing as the feature of this embodiment will be described later.

In step S613, the CPU 113 transmits a print preparation completion notification to the ASIC 100 via the inter-ASIC IF control unit 114. The transmitted print preparation completion notification is processed in step S603. In step S614, image data reception control is executed for each band. Upon completion of reception of image data for one band, the process advances to step S615. In step S615, whether transmission of one print job from the ASIC 100 is complete is determined based on the job end notification transmitted from the ASIC 100 in step S608. If no job end notification has been received, the process returns to step S614 to continue image data reception control; otherwise, the reception processing ends.

The image data reception processing in the ASIC 110 has been explained. The image data reception processing in the ASIC 120 is the same. The differences between these processes are contents of the received parameter information, contents of print preparation, and a communication method between the ASICs. The contents of the parameter information and print preparation will be described later.

Data exchange between the ASICs 100 and 110 is processed by the inter-ASIC IF control units 105 and 114. However, data exchange between the ASICs 100 and 120 is slightly different since the signals are not directly connected between the ASICs. In this embodiment, the inter-ASIC IF control unit 105 and an inter-ASIC IF control unit 124 communicate with each other via the inter-ASIC IF control unit 114 and an inter-ASIC IF control unit 115 of the ASIC 110. Since the same image data is transmitted from the ASIC 100 to each of the ASICs 110 and 120, a method of performing DMA transmission from the ASIC 100 only once is desirable and a method in which the ASIC 110 transfers the image data to the ASIC 120 after storing the image data in the RAM 111 is desirable.

Figure 8:
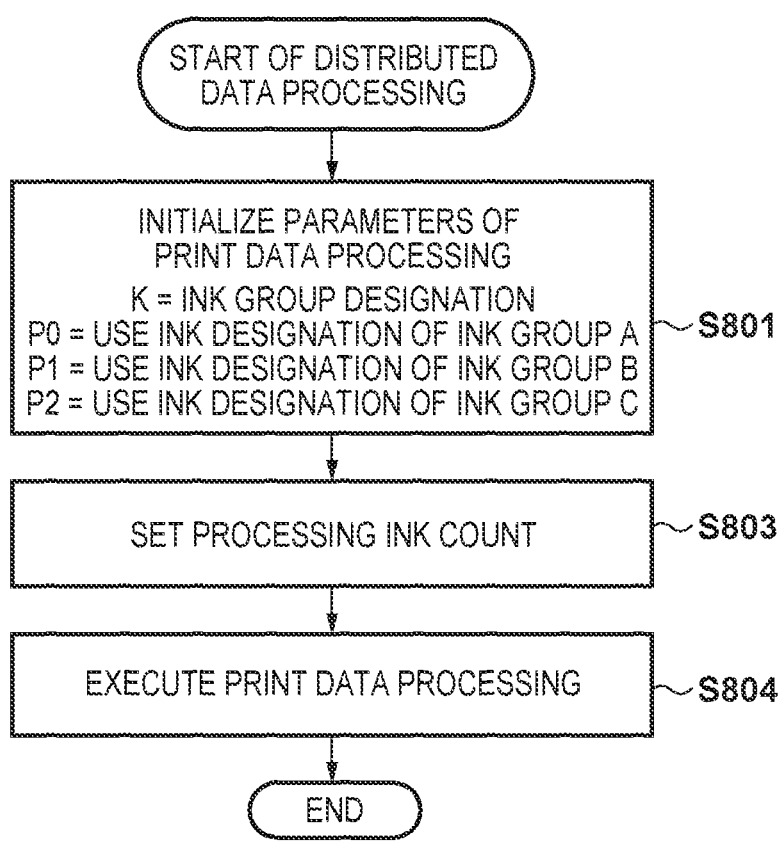
FIG. 8 is a flowchart illustrating distributed data processing control in print data processing executed by each of the ASICs 110 and 120.

FIG. 8 is a flowchart illustrating distributed data processing control in print data processing executed by each of the ASICs 110 and 120.

Processing executed by the ASIC 120 will first be described.

In step S801, the parameters set in the print data processing unit 126 based on the parameter information 702 are initialized. In ink group designation K, if ○ is designated based on the ink group designation of the ASIC 120 of the parameter information 702, the processing of the corresponding ink group is designated to be executed. As shown in FIG. 6B, ink groups A and C are designated. Use ink designations P0, P1, and P2 of ink groups A, B, and C are designated to use corresponding inks for which ○ is set based on the pieces of information of the ink groups of the ink color settings of the parameter information 701. For the ASIC 120, the 12 color inks are designated. Upon end of this designation processing, the process advances to step S803.

In step S803, using the ink color settings of the ink groups designated in the ink group designation K, parameters for a color conversion table and quantization processing are set. In the ASIC 120, parameters are set based on the ink color settings P0 and P2 in ink groups A and C. That is, parameters are set to execute data processing for eight color inks.

In step S804, print data processing is executed to generate print data of the ink colors designated in the ink color settings P0 and P2. The processing of the ASIC 120 then ends.

The same processing is executed by the ASIC 110. In the ASIC 110, ink group B is designated and print data processing is executed using only the ink color setting P1. In this way, print data for only the ink group associated with the HB chip is generated, and the print data need not be exchanged between the ASICs 110 and 120, thereby reducing the data band between the ASICs.

FIG. 9 is a flowchart illustrating distributed processing in the head control of each of the ASICs 110 and 120.

Processing executed by the ASIC 120 will first be described.

In step S901, the parameters set in the head IF control unit 127 based on the parameter information 702 are initialized. Based on the HB control signal group designation of the ASIC 120 of the parameter information 702, if ○ is designated, a corresponding signal group is used and thus a flag "1" is set in HB control signal group designation L formed from 3 bits. Therefore, as indicated by FIG. 6B, a binary number "110" is set in the HB control signal group designation L.

Based on HB control signal groups A, B, and C, if ○ is designated, a flag "1" is set in a corresponding one of use data signal designations Q0, Q1, and Q2 of the HB control signal groups. Therefore, as indicated by FIG. 6B, a hexadecimal number "F" is set in Q0 and Q1, and "0" is set in Q2. Furthermore, an HB control signal group count M and an HB control signal group number t are initialized. That is, M is set to 3 and t is set to 0. After the setting, the process advances to step S902. Initially, t=0 is set.

In step S902, it is checked whether L[t] is 1. If L[t]=1, the process advances to step S903. Alternatively, if L[t]=0, the process advances to step S904. As indicated by FIG. 6B, since L[0]=1 is initially (t=0) set in the ASIC 120, the process advances to step S903. In step S903, control of HB control signal group A is turned on. If control of HB control signal group A is turned on, output of the clock signal CLK is set. Subsequently, in step S905, a data signal number x and a data signal count U in the HB control signal group are initialized, that is, x=0 and U=4 are set.

After that, in step S906, it is checked whether Qt[x]=1. If Qt[x]=1, the process advances to step S907. Alternatively, if Qt[x]=0, the process advances to step S908. As described above, since Q0[0]=1, the process advances to step S907. In step S907, data of an ink color corresponding to the data signal Data is designated, and execution of control based on the print data is designated. After that, in step S909, "x+1" and "U−1" are calculated, and the process advances to step S910. In step S910, it is checked whether U=0. If U=0, the process advances to step S911; otherwise, the process returns to step S906.

Since U=3 in the first processing loop, the process returns to step S906, and the processes in steps S906 to S910 are repeated until U=0. If U=0, the process advances to step S911.

In the settings of this embodiment, no unused data signals Data are set. Thus, the process never advances to step S908. If an unused data signal Data is set, it is designated in step S908 to always transmit null information.

As described above, even if the common clock signal CKL is used, it is unnecessary to transmit print data for a data signal corresponding to an unused ink.

In step S911, "t+1" and "M−1" are calculated. In step S912, it is checked whether M=0. If M=0, the process advances to step S913; otherwise, the process returns to step S902. In the first processing, M=2 and t=1 and thus the process returns to step S902. Then, L[1]=1 is determined and the process advances to step S903. In step S903, control of the HB control signal group B is turned on. The subsequent processing is the same since the parameters are the same as those for HB control signal group A. The process returns to step S902 again. In this case, since L[2]=0 is determined in step S902, the process advances to step S904.

In step S904, control of HB control signal group C is turned off. If control of HB control signal group C is turned off, a setting is made to output no clock signal CLK. Since no clock signal is output, it is also unnecessary to set the data signals Data. After that, the process advances to steps S911 and S912.

If the processing loop is executed three times, M=0 is determined in step S912, and thus the process advances to step S913. At this time, setting for all the HB control signal groups ends. After that, in step S913, control of the printhead is executed using the clock signals CLK and the data signals Data.

The same processing is executed by the ASIC 110. That is, based on the parameter information 702, the parameters for controlling the printhead are initialized, and the HB chip connected to the ASIC 110 can be controlled.

As described above, even if the printhead for executing control using one clock signal for a plurality of data signals is used, it is possible to control the printhead based on the HB control signal groups set in accordance with the ink groups without exchanging print data between the ASICs. Furthermore, by designating OFF of an unused HB control signal group, generation of an unnecessary clock signal and supply of print data are unnecessary, and thus unnecessary print data need not be generated.

Second Embodiment

In the first embodiment, the operation for distributed data processing and distributed print control for the printhead 201 having the configuration in which print data corresponding to different ink colors are respectively assigned to nozzle arrays has been described. For a serial printer, there is provided a printing method called multi-pass printing which reduces printing nonuniformity by discharging ink by a plurality of scans in the same area and then completing printing. As the number of scans is larger, printing nonuniformity can be reduced. On the other hand, a large number of scans pose a problem that the printing time is prolonged. To solve this problem, there is provided a printing method using a symmetric printhead, as proposed in Japanese Patent Laid-Open No. 8-295034. More specifically, there is proposed a technique of decreasing the number of scans of multi-pass printing by assigning inks to a plurality of nozzle arrays provided in the printhead to be left-right symmetric and setting the same ink discharge order for forward print and backward print.

In this embodiment, distributed data processing and distributed print control in a case where printing is executed using a symmetric printhead and seven color inks will be described. Note that this embodiment is different from the first embodiment in the configuration of the printhead, assignment of ink colors, parameter information, distributed data processing, and distributed print control, and a printing apparatus has the same hardware configuration as in the first embodiment. Thus, only operations and processes as the features of this embodiment will be described.

In this embodiment, a printhead 201 is used as a symmetric printhead using seven color inks.

In the first embodiment, the ink colors of an ink group are determined for each HB chip, and print data corresponding to the ink colors are respectively assigned to the nozzle arrays in the HB chip. To the contrary, in the symmetric printhead used in this embodiment, an ink group A 591 includes inks of C, M, Y, and PM, an ink group B 592 includes inks of BK, MBK, MBK, and GY, and an ink group C 593 includes inks of PC, Y, M, and C. Note that MBK is not used in this embodiment.

More specifically, with reference to FIG. 3, 12 nozzle arrays 420 to 431 are sequentially assigned with eight color inks of C, M, Y, PM, BK, MBK, MBK, GY, PC, Y, M, and C so that some of the color inks overlap. In this configuration, inks of C, M, and Y are assigned from each of the left and right ends to be symmetric. Note that in the symmetric printhead, the discharge order of the overlapping inks need only be the same in forward print and backward print, and the order of the ink colors is not limited.

FIGS. 10A and 10B are tables each showing parameter information generated by a CPU 103 of an ASIC 100 based on a print job according to the second embodiment. As will be apparent by comparing FIGS. 10A and 10B with FIGS. 6A and 6B, this embodiment is different from the first embodiment in designated parameter values and generation of different HB control-related parameters for forward print and backward print. Contents of the parameters are the same. Therefore, only parameters specific to this embodiment will be described. Parameter information 1001 shown in FIG. 10A indicates designation of ink colors to be used for each ink group in 7-color printing. At this stage, ON/OFF information for each ink group is indicated regardless of overlapping of ink colors.

More specifically, all the four colors of ink group A, two colors of BK and GY of ink group B, and all the four colors of ink group C are designated. Simply, 10 color inks in total are designated. Parameter information 1002 is the parameter information of the symmetric printhead configuration created by the CPU 103 of the ASIC 100 based on the parameter information 1001. The parameter information 1002 is different from the parameter information 702 in that HB control signal group designation and data signal designations in HB control signal groups A to C are prepared for each of forward print and backward print. Based on these pieces of information, control of switching over between HB control in forward print and that in backward print is executed.

In the parameter information for forward print, BK and GY as Data0 and Data3 of an ASIC 110 are designated and PM, PC, Y, M, and C as Data3 to Data 7 of an ASIC 120 are designated. At the time of forward print, inks are discharged at the same position sequentially from the nozzle array 431, and thus inks of C, M, Y, PC, GY, BK, and PM are discharged. In the parameter information for backward print, BK and GY as Data0 and Data3 of the ASIC 110 are designated and C, M, Y, PM, and PC as Data0 to Data4 of the ASIC 120 are designated. At the time of backward print, inks are discharged at the same position sequentially from the nozzle array 420, and thus inks of C, M, Y, PM, BK, GY, and PC are discharged.

Based on the parameter information 1002 shown in FIG. 10B, distributed print control in the symmetric printhead is executed. In the distributed data processing according to the first embodiment, the processing ink count is set based on the total ink count set in ink groups A to C. However, in the case of the symmetric printhead, there are overlapping ink colors, and thus print data processing can be executed by considering the overlapping ink colors as one ink color.

The distributed data processing in the symmetric printhead will be described next.

Figure 11:
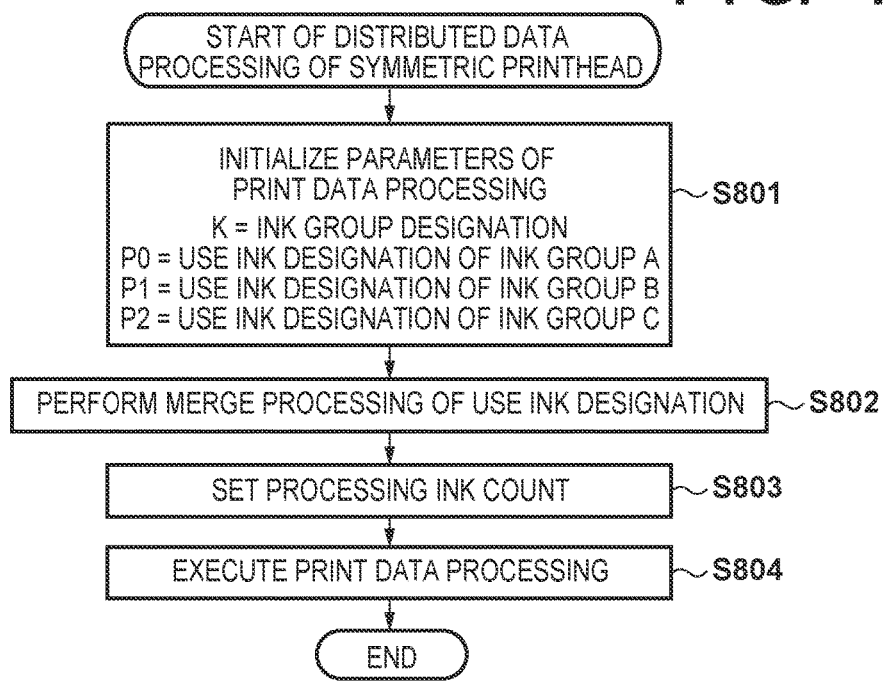
FIG. 11 is a flowchart illustrating distributed data processing for a symmetric printhead, which is executed by each of ASICs.

FIG. 11 is a flowchart illustrating the distributed data processing for the symmetric printhead, which is executed by each of the ASICs 110 and 120. Note that in FIG. 11, the same step numbers as those in FIG. 8 denote the same processes already described and a description thereof will be omitted. Only processes specific to this embodiment will be explained.

FIG. 11 is different from FIG. 8 in that step S802 is inserted between steps S801 and S803.

The processing executed by the ASIC 120 will first be described.

In step S802, the ink color settings of the ink groups designated in ink group designation K are analyzed. If the identical ink colors exist, one of the ink color settings is rewritten from ○ to x, thereby merging the ink colors of data processing. For the ASIC 120, C, M, Y, and PM of ink group A and PC, Y, M, and C of ink group C are designated, resulting in eight colors in total. However, the overlapping ink colors are merged in step S802, resulting in five colors.

The process advances to step S803, the settings of the five ink colors as the total of the merged ink color designation generated in step S802 are set in the print data processing unit 126. This can reduce, by three, the number of ink colors to be processed, and a decrease in processing time and a reduction in capacity of an allocated memory area for storing data in the RAM 121 can be expected.

Note that there are no overlapping colors in the ASIC 110 and thus settings of two ink colors are kept.

Figure 12:
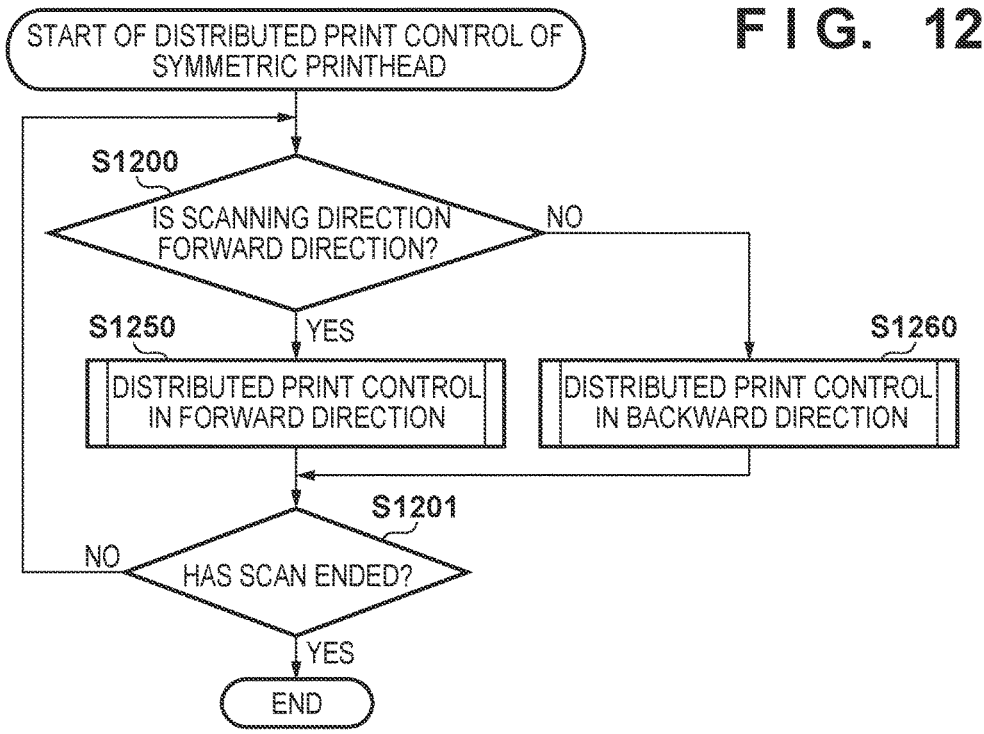
FIG. 12 is a flowchart illustrating distributed data processing for the symmetric printhead, which is executed by each of the ASICs.
Figure 13B:
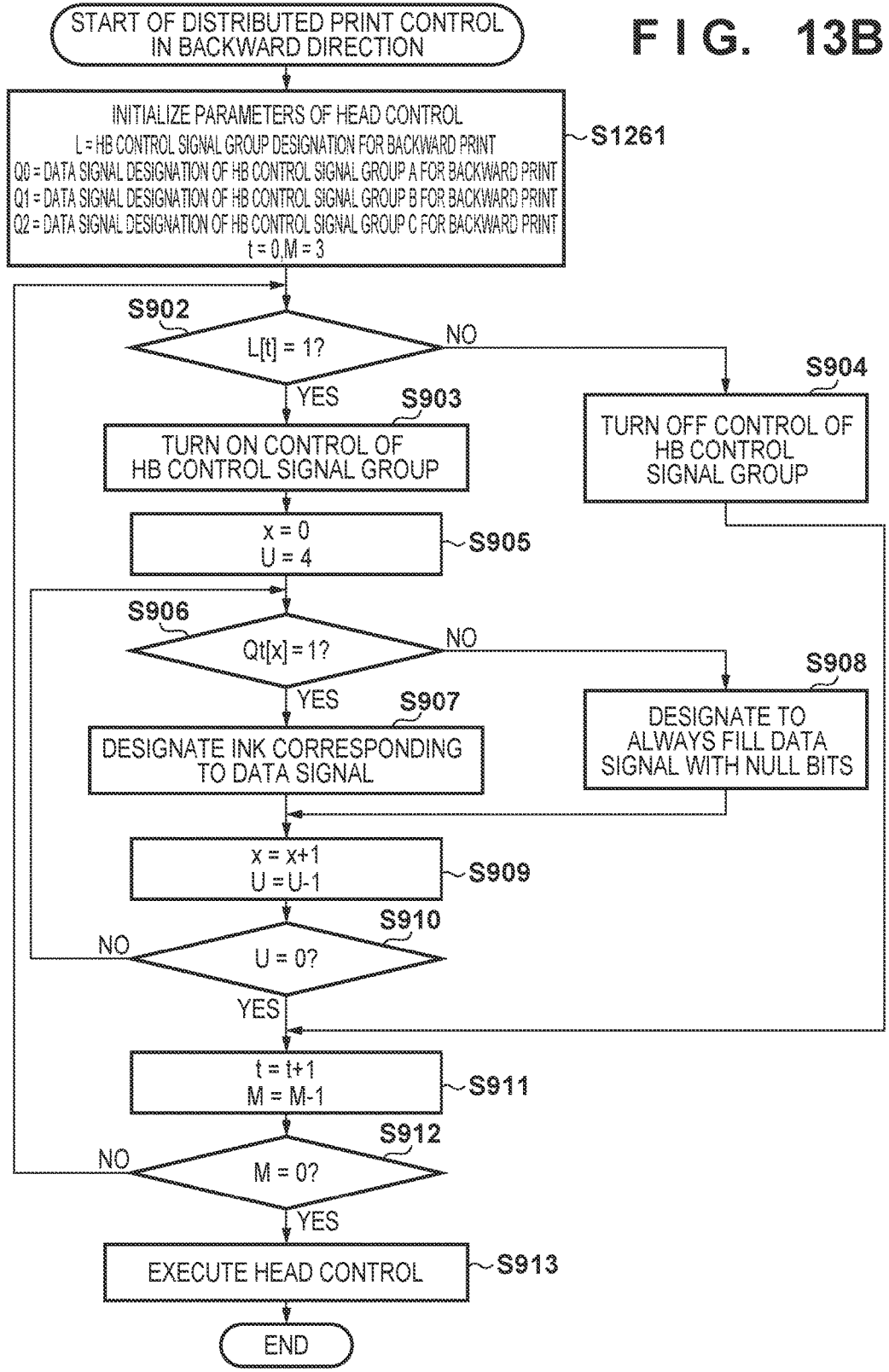

FIGS. 12 to 13B are flowcharts illustrating distributed print control processing for the symmetric printhead, which is executed by each of the ASICs 110 and 120.

An operation related to setting of HB control in forward print is the same as that in backward print. A difference in initialization of parameters based on the parameter information 1002 depending on forward print or backward print will be described.

Distributed print control for the symmetric printhead executed by the ASIC 120 will first be described.

In step S1200, whether the scanning direction is a forward or backward direction is checked. If the scanning direction is a forward direction, the process advances to step S1250; otherwise, the process advances to step S1260. If print control in the corresponding direction ends in step S1250 or S1260, the process advances to step S1201. In step S1201, it is checked whether a scan in one print job has ended. If a scan has not ended, the process returns to step S1200; otherwise, the distributed print control of the symmetric printhead ends.

FIGS. 13A and 13B are flowcharts respectively illustrating details of the distributed print control in the forward direction in step S1250 and details of the distributed print control in the backward direction in step S1260. FIG. 13A illustrates the distributed print control in the forward direction, and FIG. 13B illustrates the distributed print control in the backward direction.

As will be apparent by comparing each of FIGS. 13A and 13B with FIG. 9, each of the processes shown in FIGS. 13A and 13B is almost the same as that of the flowchart shown in FIG. 9 and is different in parameter initialization of head control in step S1251 or S1261.

In step S1251, parameters L, Q0, Q1, and Q2 are generated based on the parameter information for forward print shown in FIG. 10B. More specifically, a binary number "011" is set in L, a hexadecimal number "8" is set in Q0, a hexadecimal number "F" is set in Q1, and "0" is set in Q2.

In step S1261, the parameters L, Q0, Q1, and Q2 are generated based on the parameter information for backward print shown in FIG. 10B. More specifically, a binary number "011" is set in L, a hexadecimal number "F" is set in Q0, a hexadecimal number "1" is set in Q1, and "0" is set in Q2.

In FIGS. 13A and 13B, processes other than the above-described processes are the same as those in FIG. 9 and are thus denoted by the same step numbers, and a description thereof will be omitted.

In the ASIC 110, since the parameters for forward print are the same as those for backward print, the same HB control signal groups are to be controlled, and a description thereof will be omitted.

As described above, by switching over the parameters for HB chip control based on the parameter information 1002 before the start of a forward or backward scan, it is possible to perform print control so that the same ink color discharge order is set for the forward and backward scans. At the time of forward print, inks are discharged in the order of C (nozzle array 431), M (nozzle array 430), Y (nozzle array 429), PC, BK, GY, and PM. At the time of backward print, inks are discharged in the order of C (nozzle array 420), M (nozzle array 421), Y (nozzle array 422), PM, BK, GY, and PC.

Therefore, according to the above-described embodiment, it is possible to minimize the load of the print data processing by processing the identical ink colors as one color without generating print data for each HB chip. Since the transmission destination of print data obtained by merging identical colors into one color is switched over by the control parameters of the HB control signal groups depending on the forward or backward scanning direction, the print data can be transferred to a targeted HB chip without exchanging the print data between the ASICs. In this way, it is possible to perform print control for setting the same ink discharge order in forward print and backward print, which is the feature of the symmetric printhead, while reducing the data processing amount of each ASIC.

Third Embodiment

In the first embodiment, the distributed data processing and distributed print control for the printhead that executes printing using the 12 color inks have been described. A printing apparatus for performing multi-pass printing using such printheads may have a parallelly arranged configuration in which the printheads are arrayed in the scanning direction to increase an ink discharge amount and decrease the number of scans. Furthermore, a serially arranged configuration in which the printheads are arrayed in the nozzle arrangement direction may be considered to increase a print area for one scan.

This embodiment will describe the controller of a printing apparatus on which serially arranged heads using 12 color inks are mounted. Note that the controller using the serially arranged heads according to this embodiment is different from the controller using the printhead according to the first embodiment only in the number of ASICs and the number of HB chips (that is, the number of printheads), the connection pattern of the ASICs and HB chips, and parameter information. Only a configuration and operations specific to this embodiment will be described.

Figure 14:
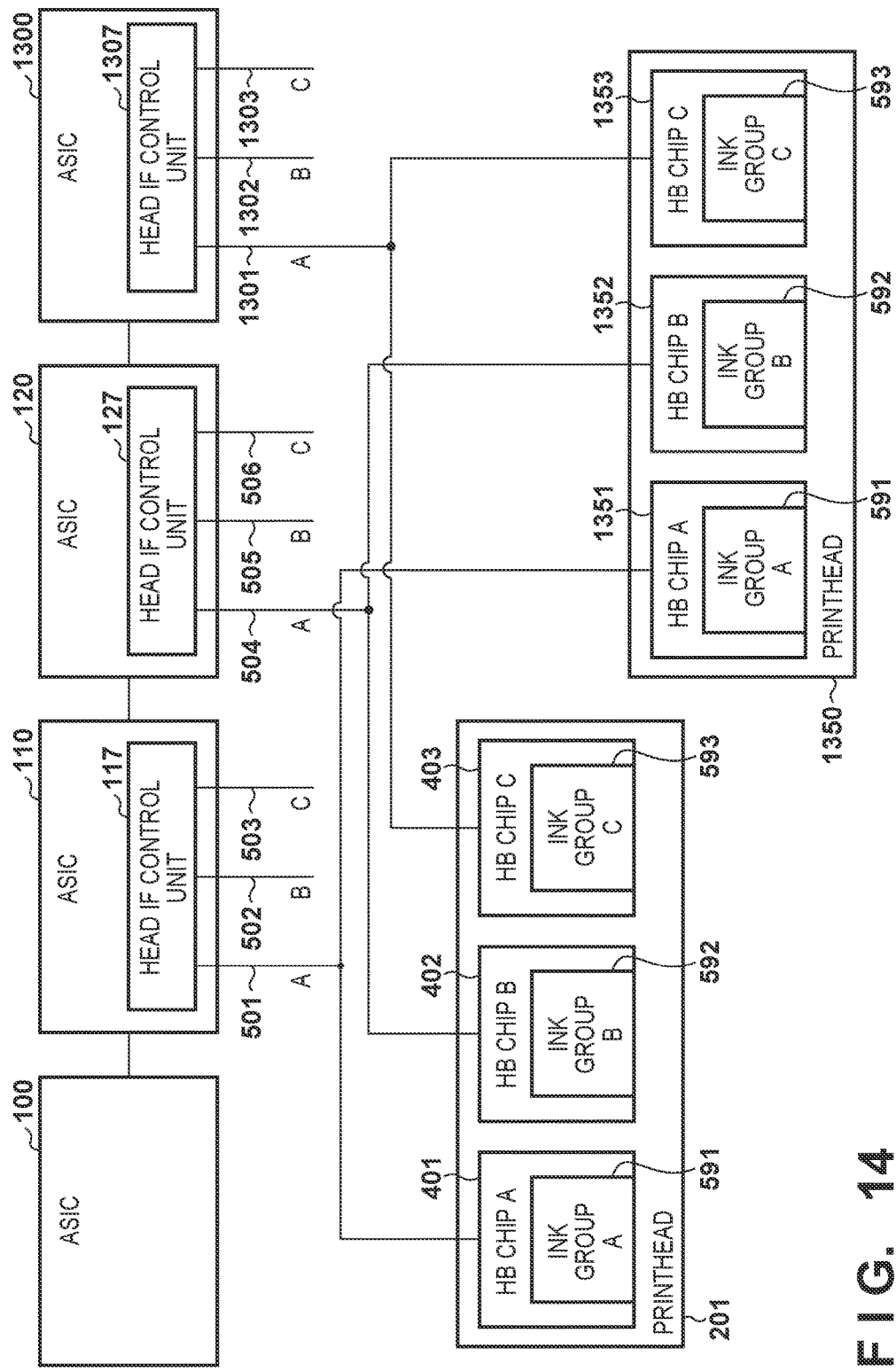
FIG. 14 is a view showing the connection configuration between serially arranged heads and ASICs according to the third embodiment.

FIG. 14 is a view showing the connection configuration between serially arranged heads and ASICs according to the third embodiment. Note that in FIG. 14, the same reference numerals as those in FIGS. 4 and 5 denote the same components already described and a description thereof will be omitted.

As will be apparent by comparing FIG. 14 with FIG. 5, a configuration according to this embodiment is obtained by adding an ASIC 1300 adjacent to an ASIC 120 and adding a printhead 1350 having the same configuration as that of a printhead 201. The printhead 1350 incorporates three HB chips 1351 to 1353, similarly to the printhead 201. These HB chips have the same configuration as that of the three HB chips implemented in the printhead 201.

In this embodiment, since the serially arranged heads are used, the printhead 1350 having the same configuration as that of the printhead 201 shown in FIG. 3 is arrayed in the nozzle arrangement direction. In this embodiment, since the 12 color inks are used, each color ink is assigned to two of 24 nozzle arrays in total, and used. Since the two printheads are arrayed in the nozzle arrangement direction, print data is distributed so that two nozzle arrays are respectively assigned with upper and lower print areas for one scan.

The ink groups of the respective HB chips will now be described.

Ink group A is assigned to an HB chip A 401 and the HB chip A 1351. Ink group B is assigned to an HB chip B 402 and the HB chip B 1352. Ink group C is assigned to an HB chip C 403 and the HB chip C 1353. That is, the upper and lower printheads of the serially arranged heads use different nozzle arrays but are assigned with the same ink group. Furthermore, a head IF control unit 117 connects the HB chips A 401 and 1351, a head IF control unit 127 connects the HB chips B 402 and 1352, and a head IF control unit 1307 connects the HB chips C 403 and 1353. In this way, the same head IF control unit is connected to the HB chips for discharging inks of the same color, thereby allowing execution of the same data processing.

A connection configuration based on the assignment of the ink groups will be described next.

An HB control signal group 501 connects the HB chips A 401 and 1351, and transmits the print data of the upper print area and that of the lower print area in the same scan. An HB control signal group 504 connects the HB chips B 402 and 1352, and transmits the print data of the upper print area and that of the lower print area in the same scan. An HB control signal group 1301 connects the HB chips C 403 and 1353, and transmits the print data of the upper print area and that of the lower print area in the same scan.

Note that in the example shown in FIG. 14, HB control signal groups 502, 503, 505, 506, 1302, and 1303 are open.

FIGS. 15A and 15B are tables each showing parameter information according to the third embodiment. Note that in FIGS. 15A and 15B, a description of information already described with reference to FIGS. 6A and 6B will not be repeated. The reference numerals denote the same pieces of information.

By comparing FIGS. 15A and 15B with FIGS. 6A and 6B, the differences from the first embodiment are that the terms of the ASIC 1300 are added to parameter information 1402 and setting values are different. Since different HB chips responsible for the upper print area and lower print area are accessed in the same scan in one ASIC, settings of using HB control signal groups A and B are instructed.

As for ink group designation K, one ink group is designated for each ASIC. This prints a wide area including the upper and lower print areas but the number of ink colors processed by one ASIC is small. On the other hand, since each ASIC uses the HB control signal groups of 8 nozzle arrays for the upper and lower print areas, Data0 to Data7 are designated.

By using such parameter information, it is possible to control to divide the print data of each color component into data of upper and lower print areas, and distribute them to two HB chips while one ASIC processes only the print data corresponding to the inks of one ink group.

According to the above-described embodiment, therefore, it is possible to execute printing of a wide area for one scan by taking advantage of the features of the serially arranged heads while reducing the number of colors of data processing for each ASIC without exchanging print data between the ASICs.

Note that the present invention is not limited to the ink colors described in each of the above embodiments. For example, a white (W) ink may be used instead of the red (R) ink. The RAM used for the controller may be an SRAM or DRAM, and the present invention is not limited to the type of RAM. In addition, an image data format transmitted from the ASIC 100 is the RGB format in the above description. The present invention, however, is not limited to this. For example, the CMYK format may be used. Any format may be used as long as it is possible to generate print data of ink color components from multi-valued image data transmitted from the ASIC 100.

Furthermore, the present invention is not limited to the configuration of the controller described in each of the above embodiments. For example, in the above embodiments, one host IF is included. However, a plurality of host IF connectors and a plurality of host IF control units may be included and connected to the ASIC 100, and the present invention is not limited to the number of host IFs. Although the wired LAN has been exemplified as the host IF, the present invention is not limited to the type of host IF and a USB or wireless LAN may be used. In the present invention, any IF to which the user side can input data may be used, and the ASIC needs only be able to control reception from the IF directly or via a conversion IC. Therefore, if the ASIC has a function capable of controlling a USB device, a USB may be used as the host IF. Alternatively, a wireless LAN may be used as the host IF so that the IF of the LAN or USB can receive data via a wireless LAN control IC. If a plurality of host IFs can be controlled, the present invention need not be limited to one host IF.

Although the host IF control unit of the ASIC 100 is used in the above embodiments, the host IF control unit of the ASIC 110 or 120 may be used. That is, the present invention is not limited to the configuration according to each of the above-described embodiments, and any configuration capable of transmitting the same image data to the ASICs each using the print data processing unit may be adopted. Furthermore, the above embodiments assume that the data transmission side serves as the master of the inter-ASIC IF control units. However, either of the control units may serve as a master in data transmission/reception. That is, as long as it is possible to transmit the same image data to the ASICs each using the print data processing unit, the present invention is not limited to the master/slave relationship.

In addition, the present invention is not limited to the connection configuration of the common buses of the computer described in each of the above embodiments. A configuration in which at least the control unit, processing unit, or CPU of each ASIC can access the RAM and the CPU can access the ROM may be adopted. As for the configuration of each ASIC, the plurality of ASICs have the same configuration in each of the above embodiments. The present invention, however, is not limited to this. For example, ASICs each for executing processing related to ink colors need only have the same configuration, and different ASICs or general-purpose ASSPs may be adopted as ASICs for executing processing irrelevant to ink colors. In each of the above-described embodiments, the ASIC 100 connected to the host IF connector is configured not to execute processing related to ink colors. The functions of the ASICs 100 and 110 may be integrated into one ASIC. In this case, the ASIC connected to the host IF connector performs processing corresponding to ink colors. In addition to the ASIC obtained by integrating the ASICs 100 and 110, and the ASIC 120, an ASIC which includes a circuit having the same function as that of the ASIC 120, and receives a signal from the inter-ASIC IF of the ASIC 120 to perform image processing without connecting to the host IF connector may be included.

Furthermore, in the above-described embodiment, PCI-Express is adopted as the inter-ASIC IF. The present invention, however, is not limited to this. For example, any IF capable of transmitting image data between the ASICs is adopted, and it is only necessary to read out/write image data from/in the memory via the IF.

Each of the above-described embodiments adopts the configuration in which the heater board chip is used as a mechanism of discharging ink from the printhead, and heat energy is used as ink discharge energy. The present invention, however, is not limited to this. For example, a piezo-electric element may be used as a printing element to discharge ink droplets.

The processing parameters used in color space processing into the dRGB space are set as common parameters. The present invention, however, is not limited to them, and processing parameters other than those related to ink colors may be set as common parameters. For example, processing parameters for generating attribute information capable of identifying a color from the RGB space may be set as common parameters. On the other hand, parameters used in ink color space conversion or processing for lowering the number of gradations are set as individual parameters. The present invention, however, is not limited to this, and parameters for processing related to ink colors may be set as individual parameters. For example, parameters associated with gamma correction processing for adjusting a discharge amount for each ink color may be set. Furthermore, in each of the above-described embodiments, processing related to the common parameters is executed by the print data processing units of the ASICs 110 and 120. However, the processing may be executed by the print data processing unit 106 of the ASIC 100. That is, as long as data processing related to ink colors is distributed to the ASICs 110 and 120, the present invention is not limited to the configuration described in each of the above-described embodiments.

In addition, in each of the above-described embodiments, printable print data is binary image data. The present invention, however, is not limited to this. For example, n-ary data having 2 or 4 bits for each color component of each pixel may be used, and any print data controllable by the head IF control unit for the printhead may be used. For example, even if 2-bit print data is used, if only a binary value of ON/OFF of 0/1 can be transmitted to the printhead, the head IF control unit may perform thinning processing to obtain 1-bit data.

Each of the above-described embodiments has exemplified the single-function printing apparatus. The present invention, however, is not limited to this. For example, a multifunction printer (copying machine) including the above-described printing apparatus and an image reading apparatus (scanner apparatus) may be used, and a multifunction peripheral which has a facsimile function in addition to the copying machine may be used.

The program may be executed by a single computer or a plurality of computers in cooperation. Not all of the above processes are necessarily implemented by software, and some or all of the processes may be implemented by hardware such as an ASIC. Furthermore, it is not necessary to perform all the processes by one CPU, and a plurality of CPUs may perform the processes in cooperation, as needed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-192224, filed Sep. 29, 2015, which is hereby incorporated by reference herein in its entirety.

What is claimed is:

1. A print control apparatus which includes a plurality of nozzle arrays each formed from a plurality of nozzles for discharging ink, and controls a printhead for executing printing on a print medium by discharging inks of a plurality of colors from the plurality of nozzle arrays, the apparatus comprising:
a reception unit configured to receive image data from an external apparatus;
a generation unit, comprised of a plurality of integrated circuits, each including, as a component, a data processing unit for processing image data, configured to generate print data to be output to the printhead by using the plurality of integrated circuits to execute data processing for the image data received by the reception unit; and
a transmission unit configured to transmit the print data generated by the generation unit to the printhead, wherein
one integrated circuit of the plurality of integrated circuits includes a first interface configured to receive the image data from the reception unit,
each of the rest of the plurality of integrated circuits, respectively, includes a third interface configured to transfer data to the transmission unit,
each of the plurality of integrated circuits includes a second interface configured to communicate with another integrated circuit,
the one integrated circuit executes common data processing for the plurality of colors with respect to the image data received by the reception unit, and transfers, via the second interface, the image data which has undergone the common data processing to another integrated circuit responsible for executing specific data processing related to each of the plurality of colors, and
the rest of the plurality of integrated circuits, respectively, executes, for the image data, input via the second interface, having undergone the common data processing, the specific data processing related to an ink color by the data processing unit, generates print data corresponding to the ink color for which the other integrated circuit is responsible by causing the data processing unit to execute, for the image data, input via the second interface, having undergone the common data processing, the specific data processing related to the ink color, and transfers the generated print data to the transmission unit via the third interface.

2. The apparatus according to claim 1, wherein each of the plurality of integrated circuits includes, as components,
the first interface,
the second interface, and
the third interface.

3. The apparatus according to claim 2, wherein
an integrated circuit for executing the common data processing does not use the data processing unit and the third interface, and
the other integrated circuit for executing the specific data processing related to each of the plurality of colors does not use the first interface.

4. The apparatus according to claim 3, wherein
the printhead includes a plurality of chips each having the plurality of nozzle arrays,
a plurality of inks discharged from each of the plurality of chips form an ink group, and
each of the rest of the plurality of integrated circuits generates print data for each formed ink group, and transfers the generated print data to a corresponding chip via the transmission unit.

5. The apparatus according to claim 1, wherein the colors of the inks respectively discharged from the plurality of nozzle arrays are different.

6. The apparatus according to claim 1, wherein
some of the colors of the inks respectively discharged from the plurality of nozzle arrays overlap, and
print data corresponding to the overlapping ink colors are generated by the same integrated circuit.

7. The apparatus according to claim 1, wherein in a case where a plurality of printheads are arrayed in an arrayed direction of the plurality of nozzles, print data corresponding to inks of the same color are generated by the same integrated circuit with respect to the plurality of printheads.

8. The printing apparatus according to claim 1, further comprising:
a scan unit configured to reciprocally scan by incorporating the printhead; and
a conveyance unit configured to convey the print medium in a direction different from a scanning direction by the scan unit.

9. The apparatus according to claim 8, wherein in a case where some of the colors of the inks respectively discharged from the plurality of nozzle arrays overlap, the nozzle arrays which discharge the inks of the overlapping colors are symmetric with respect to the scanning direction by the scan unit.

10. The apparatus according to claim 8, wherein in a case where a plurality of printheads are mounted, the plurality of printheads are arrayed in one of the scanning direction by the scan unit and a conveyance direction by the conveyance unit.

11. The apparatus according to claim 1, wherein each of the integrated circuits executes processing for lowering a number of gradations represented by the image data, according to a parameter used for the specific data processing related to each of the plurality of colors.

12. The apparatus according to claim 11, wherein the common data processing includes processing for determining an ink group count and an ink group designation as to which color ink is to be used, based on a print condition for each print job.

13. A print control apparatus which includes a plurality of nozzle arrays each formed from a plurality of nozzles for discharging ink, and controls a printhead for executing printing on a print medium by discharging inks of a plurality of colors from the plurality of nozzle arrays, the apparatus comprising:
a reception unit configured to receive image data from an external apparatus;
a generation unit configured to generate print data to be output to the printhead by causing one of a plurality of integrated circuits to execute at least common data processing for generating print data corresponding to the plurality of colors with respect to the image data received by the reception unit, and causing another one of the plurality of integrated circuits to execute specific data processing related to each of the plurality of colors; and
a transmission unit configured to transmit the print data generated by the generation unit to the printhead, wherein
each of the plurality of integrated circuits includes, as components,
a first interface configured to receive the image data from the reception unit
a second interface configured to communicate with another integrated circuit
a data processing unit configured to process the received image data; and
a third interface configured to transfer data to the transmission unit,
each of the plurality of integrated circuits includes a component to be used and a component not to be used in accordance with whether the common data processing or the specific data processing related to each of the plurality of colors is executed,
an integrated circuit for executing the common data processing does not use the second interface, uses the data processing unit and the third interface, generates print data corresponding to an ink color for which the integrated circuit is responsible by executing the common data processing for the image data received by the reception unit and input via the first interface, and causes the data processing unit to execute specific data processing related to the ink color for the image data having undergone the common data processing, and transmits the generated print data to the transmission unit via the third interface, and
another integrated circuit which does not execute the common data processing does not use the first interface, generates print data corresponding to an ink color for which the other integrated circuit is responsible by causing the data processing unit to execute specific data processing related to the ink color for the image data having undergone the common data processing and input via the second interface, and transmits the generated print data to the transmission unit via the third interface.

14. The apparatus according to claim 13, further comprising:
a scan unit configured to reciprocally scan by incorporating the printhead; and
a conveyance unit configured to convey the print medium in a direction different from a scanning direction by the scan unit.

15. A data processing method for a print control apparatus which controls a printhead, including a plurality of nozzle arrays each formed from a plurality of nozzles for discharging ink, for executing printing on a print medium by discharging inks of a plurality of colors from the plurality of nozzle arrays, the method comprising:
receiving image data from an external apparatus;
generating print data to be output to the printhead by using a plurality of integrated circuits, each including, as a component, a data processing unit for processing image data, to execute data processing for the received image data; and
transmitting the generated print data to the printhead, wherein
one integrated circuit of the plurality of integrated circuits includes a first interface configured to receive the image data,
each of the rest of the plurality of integrated circuits, respectively, includes a third interface configured to transfer data to the printhead,
each of the plurality of integrated circuits includes a second interface configured to communicate with another integrated circuit,
the one integrated circuit executes common data processing for the plurality of colors with respect to the received image data, and transfers, via the second interface, the image data which has undergone the common data processing to another integrated circuit responsible for executing specific data processing related to each of the plurality of colors, and
the rest of the plurality of integrated circuits, respectively, executes, for the image data, input via the second interface, having undergone the common data processing, the specific data processing related to an ink color by the data processing unit, generates the print data corresponding to the ink color for which the other integrated circuit is responsible by causing the data processing unit to execute, for the image data, input via the second interface, having undergone the common data processing, the specific data processing related to the ink color, and transfers the generated print data to the printhead via the third interface.

16. The method according to claim 15, wherein each of the plurality of integrated circuits includes, as components, the first interface, the second interface, and the third interface.

17. The method according to claim 16, wherein
in an integrated circuit for executing the common data processing,
the data processing unit and the third interface are selected as components not to be used, and
in the other integrated circuit for executing the specific data processing related to each of the plurality of colors,
the first interface is selected as a component not to be used, and the data processing unit, the second interface, and the third interface are selected as components to be used.

18. The method according to claim 15, wherein the colors of the inks respectively discharged from the plurality of nozzle arrays are different.

19. The method according to claim 15, wherein
some of the colors of the inks respectively discharged from the plurality of nozzle arrays overlap, and
print data corresponding to the overlapping ink colors are generated by the same integrated circuit.

20. A data processing method for a print control apparatus which controls a printhead, including a plurality of nozzle arrays each formed from a plurality of nozzles for discharging ink, for executing printing on a print medium by discharging inks of a plurality of colors from the plurality of nozzle arrays, the method comprising:
receiving image data from an external apparatus;
generating print data to be output to the printhead by causing one of a plurality of integrated circuits to execute at least common data processing for generating print data corresponding to the plurality of colors with respect to the received image data, and causing another one of the plurality of integrated circuits to execute specific data processing related to each of the plurality of colors; and
transmitting the generated print data to the printhead,
wherein a component to be used and a component not to be used are selected for each of the plurality of integrated circuits in accordance with whether the common data processing or the specific data processing related to each of the plurality of colors is executed,
wherein each of the plurality of integrated circuits includes, as components, a first interface configured to receive the image data, a second interface configured to communicate with another integrated circuit, a data processing unit configured to process the received image data, and a third interface configured to transfer data to the printhead, and
in an integrated circuit for executing the common data processing,
the second interface is selected as a component not to be used, the first interface, the data processing unit, and the third interface are selected as components to be used, print data corresponding to an ink color for which the integrated circuit is responsible is generated by executing the common data processing for the received image data input via the first interface and causing the data processing unit to execute specific data processing related to the ink color for the image data having undergone the common data processing, and the generated print data is transferred to the printhead via the third interface, and
in another integrated circuit which does not execute the common data processing,
the first interface is selected as a component not to be used, the second interface, the data processing unit, and the third interface are selected as components to be used, print data corresponding to an ink color for which the other integrated circuit is responsible is generated by causing the data processing unit to execute specific data processing related to the ink color for the image data having undergone the common data processing and input via the second interface, and the generated print data is transferred to the printhead via the third interface.

* * * * *